(12) United States Patent
Namiki et al.

(10) Patent No.: US 10,647,001 B2
(45) Date of Patent: May 12, 2020

(54) CALIBRATION DEVICE, CALIBRATION METHOD, AND COMPUTER READABLE MEDIUM FOR VISUAL SENSOR

(71) Applicant: FANUC CORPORATION, Minamitsuru-gun, Yamanashi (JP)

(72) Inventors: Yuuta Namiki, Yamanashi (JP); Fumikazu Warashina, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/862,103

(22) Filed: Jan. 4, 2018

(65) Prior Publication Data

US 2018/0194008 A1    Jul. 12, 2018

(30) Foreign Application Priority Data

Jan. 12, 2017    (JP) .................. 2017-003667

(51) Int. Cl.
*B25J 9/16* (2006.01)
*G06T 7/73* (2017.01)
*G06T 7/80* (2017.01)

(52) U.S. Cl.
CPC .......... *B25J 9/1692* (2013.01); *B25J 9/1697* (2013.01); *G06T 7/73* (2017.01); *G06T 7/80* (2017.01);
(Continued)

(58) Field of Classification Search
CPC ...... B25J 9/1692; B25J 9/1697; B25J 9/1664; B25J 9/1666; B25J 19/023; Y10S 901/09;
(Continued)

(56) References Cited

U.S. PATENT DOCUMENTS 5,329,469 A    7/1994    Watanabe
6,101,455 A    8/2000    Davis
(Continued)

FOREIGN PATENT DOCUMENTS

CN    101100061    1/2008
CN    103372862    10/2013
(Continued)

OTHER PUBLICATIONS

Office Action dated Nov. 21, 2018 in CN Patent Application No. 201810023805.6.
(Continued)

*Primary Examiner* — Spencer D Patton
(74) *Attorney, Agent, or Firm* — Wenderoth, Lind & Ponack, L.L.P.

(57) ABSTRACT

For calibration on a single camera or a stereo camera, a calibration range is set in advance in an image coordinate system and the calibration is performed in an arbitrary range. A visual sensor controller is a calibration device that associates a robot coordinate system at a robot and an image coordinate system at a camera by placing a target mark at the robot, moving the robot, and detecting the target mark at multiple points in a view of the camera. The calibration device comprises: an image range setting unit that sets an image range in the image coordinate system at the camera; and a calibration range measurement unit that measures an operation range for the robot corresponding to the image range before implementation of calibration by moving the robot and detecting the target mark.

17 Claims, 16 Drawing Sheets

(52) U.S. Cl.
CPC ............. *G05B 2219/39008* (2013.01); *G05B 2219/39016* (2013.01); *G05B 2219/39024* (2013.01); *Y10S 901/47* (2013.01)

(58) Field of Classification Search
CPC ........... Y10S 901/47; G06T 7/73; G06T 7/74; G05B 2219/39008; G05B 2219/39016; G05B 2219/39024; G05B 2219/39046
See application file for complete search history.

(56) References Cited

U.S. PATENT DOCUMENTS

| | | |
|---|---|---|
| 2008/0188983 A1 | 8/2008 | Ban et al. |
| 2015/0025683 A1 | 1/2015 | Amano |
| 2015/0142171 A1 | 5/2015 | Li et al. |
| 2015/0258688 A1 | 9/2015 | Suzumura et al. |
| 2016/0039094 A1* | 2/2016 | Lundberg ............... B25J 9/1692 700/251 |

FOREIGN PATENT DOCUMENTS

| | | |
|---|---|---|
| CN | 104511900 | 4/2015 |
| CN | 105073348 | 11/2015 |
| DE | 10 2014 100 538 | 7/2015 |
| DE | 11 2011 101 730 | 3/2016 |
| DE | 10 2015 104 582 | 9/2016 |
| EP | 2 921 267 | 9/2015 |
| JP | 2690603 | 12/1997 |
| JP | 2010-172986 | 8/2010 |
| JP | 2010-188439 | 9/2010 |
| JP | 2013-215867 | 10/2013 |
| JP | 2015-174191 | 10/2015 |
| JP | 2015-182144 | 10/2015 |
| JP | 2016-052695 | 4/2016 |

OTHER PUBLICATIONS

Office Action dated Sep. 9, 2019 in DE Patent Application No. 10 2018 200 154.5.

* cited by examiner

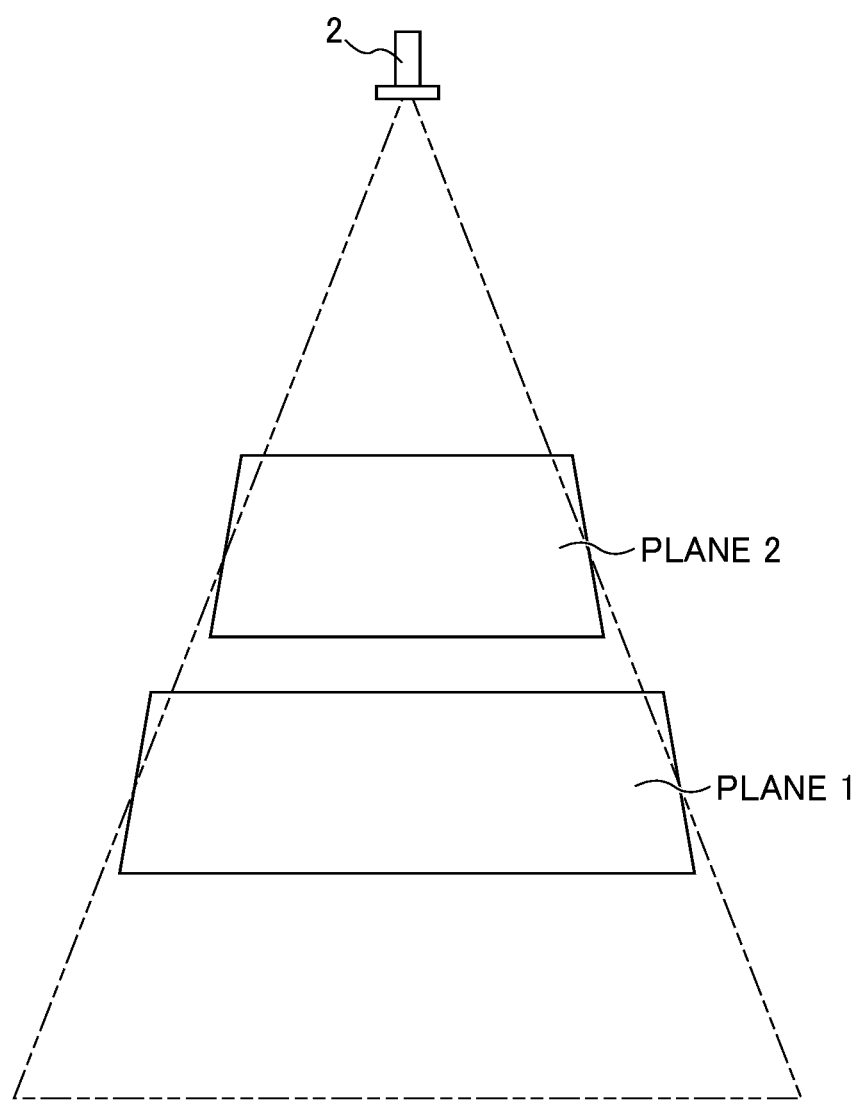

CALIBRATION DEVICE, CALIBRATION METHOD, AND COMPUTER READABLE MEDIUM FOR VISUAL SENSOR

This application is based on and claims the benefit of priority from Japanese Patent Application No. 2017-003667, filed on 12 Jan. 2017, the content of which is incorporated herein by reference.

BACKGROUND OF THE INVENTION

Field of the Invention

The present invention relates to calibration on a visual sensor, particularly, to a calibration device, a calibration method, and computer readable medium for measuring a range in which a target mark is detected during implementation of calibration using a stereo camera with multiple cameras.

Related Art

In a robot system, a robot is given a visual function. Operation such as handling or machining on a work is done by making the robot recognize the position information of a subject. This visual function is fulfilled by capturing an image of the subject with a visual sensor attached to a hand or a neighboring part of the robot or a visual sensor provided around the robot. In such a robot system, to acquire the position information of the subject viewed from the robot, calibration data is required for converting the position information of the subject in an image to the position information of the subject viewed from the robot.

Calibration data has been acquired by various conventional methods. For example, patent document 1 suggests a method of attaching a lattice pattern to the end of a robot arm and measuring the pattern with a fixedly arranged visual sensor (this method will be called a "method A"). Patent document 2 suggests a method of performing calibration by attaching a target mark having a position and a posture determined in advance in an end point coordinate system at a robot to the end of an arm, and determining the position of the target mark at multiple points in an image of the target mark captured by a visual sensor (this method will be called a "method B").

If calibration is to be performed by the method A, a pattern to be used for the calibration should be prepared in advance. If the view of a camera is too wide or too narrow for the prepared pattern, the method A fails to perform high-precision calibration. In contrast, calibration by the method B allows calibration in a wider view or calibration in a narrower view than in the method A, thereby advantageously increasing the degree of freedom of the calibration. For three-dimensional measurement, a stereo camera has been used in some cases as a visual sensor as described in patent document 3, for example. There have been the following systems for the stereo camera: a passive stereo system of matching corresponding points by using the texture of a subject; and an active stereo system of matching corresponding points by using a pattern projected on a subject. In either case, calibration is required on two or more cameras forming the stereo camera.

Patent Document 1: Japanese Patent No. 2690603
Patent Document 2: Japanese Unexamined Patent Application, Publication No. 2015-174191
Patent Document 3: Japanese Unexamined Patent Application, Publication No. 2010-172986

SUMMARY OF THE INVENTION

To calibrate a visual sensor (camera, for example) more precisely, a target mark is desirably moved through a wide area in a view range while the visual sensor (camera, for example) is calibrated. If the target mark is to collide with an obstacle while being moved in the view range, for example, a range for move of the target mark should be limited. Hence, before the visual sensor (camera, for example) is calibrated, a range of move of the target mark (hereinafter also called a "calibration range") for capturing an image of the target mark having been moved is required to be set in some way in a plane on which the target mark is to be moved during implementation of the calibration so as to allow the target mark to be moved through a wide area in the view range. The calibration range can also be designated in a robot coordinate system. However, to designate a range in the robot coordinate system for making the target mark come into the view and preventing the target mark from colliding with an obstacle, a user is required to check the target mark in an image of the target mark captured by the camera while operating a robot by hand. To eliminate the need for such troublesome operation, the calibration range is desirably set in a captured image. For calibration on multiple cameras such as those of a stereo camera, the multiple cameras are attached at separate positions, so that each camera is required to be calibrated independently. Hence, also in this case, before each camera is calibrated, a range of move of the target mark (calibration range) is required to be set for each of a first camera 21 and a second camera 22 in a plane on which the target mark is to be moved in such a manner that an image of the target mark having been moved can be captured in a range of image capture (angle of view) by each camera.

In this regard, patent document 2 does not recite that a range of move of a work 1 (calibration range) is set on a plane on which the work 1 is to move and in a range of image capture (angle of view) by an image capture unit 40 before the image capture unit 40 is calibrated. Further, the calibration described in patent document 2 is not to calibrate multiple cameras such as those of a stereo camera but is merely to calibrate a single camera. The calibration described in patent document 3 is performed by attaching a checker board as a basic matrix calculation tool to the end of a robot arm and capturing images of the checker board with a stereo camera. Thus, this calibration inherently does not correspond to calibration performed by attaching a target mark to the end of an arm, and determining the position of the target mark at multiple points where the target mark has been moved in the images of the target mark captured by the stereo camera.

The present invention provides a calibration device, a calibration method, and a program capable of setting a range of move of a target mark (calibration range) in advance in space for move of the target mark so as to make the range of move fall in a view range for a single visual sensor (camera, for example) or in a view range for each camera forming a stereo camera.

(1) A calibration device according to the present invention ("visual sensor controller 1" described later, for example) is a calibration device that associates a robot coordinate system at a robot ("robot 4" described later, for example) and an image coordinate system at a camera ("camera 2" described later, for example) by placing a target mark ("target mark 5"

described later, for example) at the robot, controlling the robot so as to move the target mark, and detecting the target mark at multiple points in a view of the camera. The calibration device comprises: an image range setting unit ("first image range setting unit 105" described later, for example) that sets an image range in the image coordinate system; and a calibration range measurement unit ("first calibration range measurement unit 106" described later, for example) that measures a calibration range as an operation range for the robot corresponding to the image range before implementation of calibration by controlling the robot to move the target mark and detecting the target mark. During implementation of the calibration, the robot is controlled so as to move the target mark in the calibration range.

(2) In the calibration device described in (1), the calibration range may be configured to be set on a plane.

(3) In the calibration device described in (1) or (2), the calibration range may be configured to be set on a plane vertical to an optical axis of the camera.

(4) In the calibration device described in (1) or (2), the calibration range may be configured to be set on a plane tilted from an optical axis of the camera.

(5) In the calibration device described in (1) or (4), the calibration range may be configured to be set on each of at least two planes.

(6) A calibration method according to the present invention ("visual sensor control method" described later, for example) is a calibration method implemented by a calibration device that associates a robot coordinate system at a robot ("robot 4" described later, for example) and an image coordinate system at a camera ("camera 2" described later, for example) by placing a target mark ("target mark 5" described later, for example) at the robot, controlling the robot so as to move the target mark, and detecting the target mark at multiple points in a view of the camera. The calibration method comprises: an image range setting step ("first image range setting step" described later, for example) of setting an image range in the image coordinate system; and a calibration range measurement step ("calibration range measurement step" described later, for example) of measuring a calibration range as an operation range for the robot corresponding to the image range before implementation of calibration by controlling the robot to move the target mark and detecting the target mark. During implementation of the calibration, the robot is controlled so as to move the target mark in the calibration range.

(7) A program according to the present invention ("program" described later, for example) causes a computer to execute the following steps. The computer controls a calibration device that associates a robot coordinate system at a robot ("robot 4" described later, for example) and an image coordinate system at a camera ("camera 2" described later, for example) by placing a target mark ("target mark 5" described later, for example) at the robot, controlling the robot so as to move the target mark, and detecting the target mark at multiple points in a view of the camera. The steps comprise: an image range setting step ("first image range setting step" described later, for example) of setting an image range in the image coordinate system; and a calibration range measurement step ("calibration range measurement step" described later, for example) of measuring a calibration range as an operation range for the robot corresponding to the image range before implementation of calibration by controlling the robot to move the target mark and detecting the target mark. During implementation of the calibration, the robot is controlled so as to move the target mark in the calibration range.

(8) A calibration device according to the present invention ("visual sensor controller 1A" described later, for example) is a calibration device that associates a robot coordinate system at a robot ("robot 4" described later, for example), position information in an image coordinate system at a first camera ("first camera 21" described later, for example) of a stereo camera ("stereo camera 2A" described later, for example), and position information in an image coordinate system at a second camera ("second camera 22" described later, for example) of the stereo camera by placing a target mark ("target mark 5" described later, for example) at the robot, controlling the robot so as to move the target mark, and detecting the target mark at multiple points in a view of the stereo camera including at least the first camera and the second camera. The calibration device comprises: a first image range setting unit ("first image range setting unit 105" described later, for example) that sets a first image range in the image coordinate system at the first camera; a second image range setting unit ("second image range setting unit 1052" described later, for example) that sets a second image range in the image coordinate system at the second camera; a first calibration range measurement unit ("first calibration range measurement unit 106" described later, for example) that measures a first calibration range as a first operation range for the robot corresponding to the first image range before the first camera and the second camera are calibrated by controlling the robot to move the target mark and detecting the target mark by using the first camera; and a second calibration range measurement unit ("second calibration range measurement unit 1062" described later, for example) that measures a second calibration range as a second operation range for the robot corresponding to the second image range before the first camera and the second camera are calibrated by controlling the robot to move the target mark and detecting the target mark by using the second camera. While the first camera and the second camera are calibrated, the robot is controlled so as to move the target mark in at least one of the first calibration range and the second calibration range, or in a range covered by both the first calibration range and the second calibration range.

(9) In the calibration device described in (8), each of the first calibration range and the second calibration range may be configured to be set on a plane.

(10) A calibration method according to the present invention ("visual sensor control method" described later, for example) is a calibration method implemented by a calibration device that associates a robot coordinate system at a robot ("robot 4" described later, for example), position information in an image coordinate system at a first camera ("first camera 21" described later, for example) of a stereo camera ("stereo camera 2A" described later, for example), and position information in an image coordinate system at a second camera ("second camera 22" described later, for example) of the stereo camera by placing a target mark ("target mark 5" described later, for example) at the robot, controlling the robot so as to move the target mark, and detecting the target mark at multiple points in a view of the stereo camera including at least the first camera and the second camera. The calibration method comprises: a first image range setting step ("first image range setting step" described later, for example) of setting a first image range in the image coordinate system at the first camera; a second image range setting step ("second image range setting step" described later, for example) of setting a second image range in the image coordinate system at the second camera; a first calibration range measurement step ("first calibration range measurement step" described later, for example) of measuring a first calibration range as a first operation range for the robot corresponding to the first image range before the first camera and the second camera are calibrated by controlling the robot to move the target mark and detecting the target mark by using the first camera; and a second calibration range measurement step ("second calibration range measurement step" described later, for example) of measuring a second calibration range as a second operation range for the robot corresponding to the second image range before the first camera and the second camera are calibrated by controlling the robot to move the target mark and detecting the target mark by using the second camera. While the first camera and the second camera are calibrated, the robot is controlled so as to move the target mark in at least one of the first calibration range and the second calibration range, or in a range covered by both the first calibration range and the second calibration range.

(11) A program according to the present invention ("program" described later, for example) causes a computer to execute the following steps. The computer controls a calibration device that associates a robot coordinate system at a robot ("robot 4" described later, for example), position information in an image coordinate system at a first camera ("first camera 21" described later, for example) of a stereo camera ("stereo camera 2A" described later, for example), and position information in an image coordinate system at a second camera ("second camera 22" described later, for example) of the stereo camera by placing a target mark ("target mark 5" described later, for example) at the robot, controlling the robot so as to move the target mark, and detecting the target mark at multiple points in a view of the stereo camera including at least the first camera and the second camera. The steps comprise: a first image range setting step ("first image range setting step" described later, for example) of setting a first image range in the image coordinate system at the first camera; a second image range setting step ("second image range setting step" described later, for example) of setting a second image range in the image coordinate system at the second camera; a first calibration range measurement step ("first calibration range measurement step" described later, for example) of measuring a first calibration range as a first operation range for the robot corresponding to the first image range before the first camera and the second camera are calibrated by controlling the robot to move the target mark and detecting the target mark by using the first camera; and a second calibration range measurement step ("second calibration range measurement step" described later, for example) of measuring a second calibration range as a second operation range for the robot corresponding to the second image range before the first camera and the second camera are calibrated by controlling the robot to move the target mark and detecting the target mark by using the second camera. While the first camera and the second camera are calibrated, the robot is controlled so as to move the target mark in at least one of the first calibration range and the second calibration range, or in a range covered by both the first calibration range and the second calibration range.

A calibration device, a calibration method, and a program provided by the present invention are capable of performing calibration with an increased degree of freedom by measuring an operation range for a robot (calibration range) corresponding to a range of move of a target mark in advance before implementation of the calibration in space where the target mark is to be moved during implementation of the calibration, based on a view range for a single visual sensor or a view range for each camera forming a stereo camera.

BRIEF DESCRIPTION OF THE DRAWINGS

FIG. 11B shows examples of planes on which a calibration range is set.

DETAILED DESCRIPTION OF THE INVENTION

First Embodiment

Figure 1:
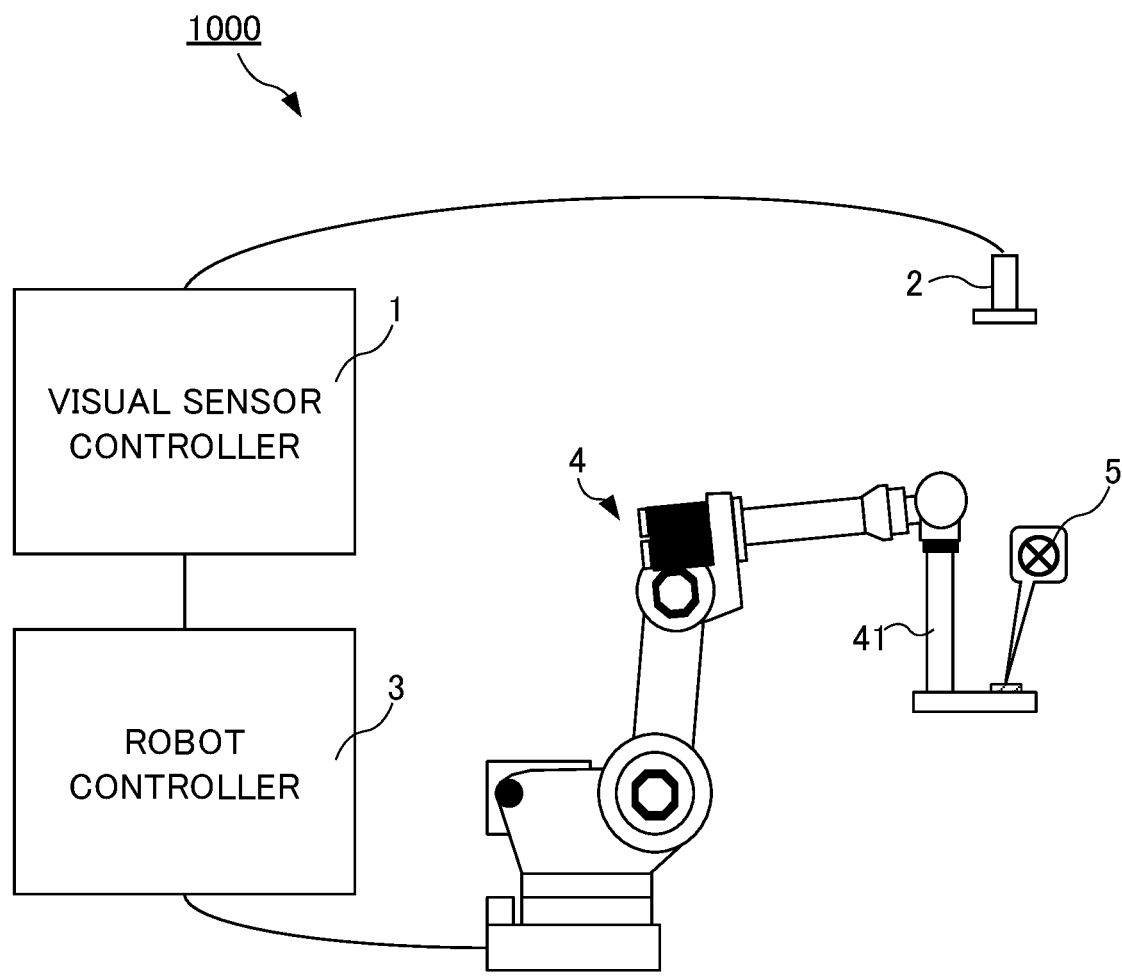
FIG. 1 shows the configuration of a robot system 1000 entirely.

An example of an embodiment (first embodiment) of the present invention will be described below. FIG. 1 shows the configuration of a robot system 1000 entirely for calibration on a visual sensor. The robot system 1000 is for performing calibration using a single camera 2. As shown in FIG. 1, the robot system 1000 includes: a visual sensor controller 1 that makes three-dimensional measurement through image processing on data about an image captured by the single camera 2; a robot 4 having an arm 41 with an end portion to which a target mark 5 is attached; and a robot controller 3 for control over the robot 4. The camera 2 is fixed to a pedestal (not shown in the drawings). In this embodiment, the visual sensor controller 1 is described as an example of a calibration device.

Figure 2:
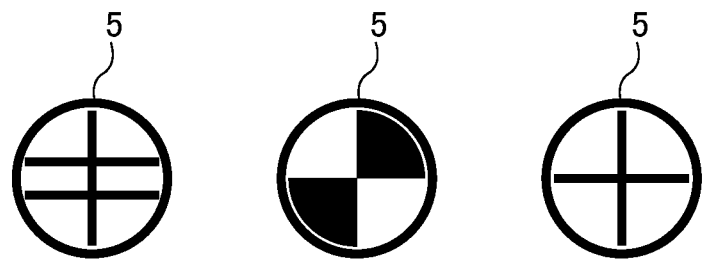
FIG. 2 shows examples of a target mark 5.

FIG. 2 shows examples of the target mark 5. The target mark 5 is not limited to these examples. Any shape is applicable to the target mark 5. Meanwhile, the shape of the target mark 5 is desirably such that the characteristics of the target mark 5 used as a model pattern are expressed on a two-dimensional plane. The target mark 5 may be a mark printed on paper or a seal and attached to the end of the arm 41 of the robot 4, for example.

The robot controller 3 recognizes the coordinate position information of the end of the arm 41 in a robot coordinate system as a current position. Thus, based on the coordinate position of the end of the arm 41 in the robot coordinate system and the known three-dimensional position information and the known three-dimensional posture of the target mark 5 in an end point coordinate system at the robot 4, the robot controller 3 can always recognize the coordinate position of the target mark 5 in the robot coordinate system while the robot controller 3 controls drive of the arm 41. The robot controller 3 includes a CPU (not shown in the drawings) for controlling the robot controller 3 entirely in an integrated fashion. The visual sensor controller 1 is connected to the robot controller 3 through an external equipment interface (not shown in the drawings). The robot controller 3 transmits a signal for triggering image processing to the visual sensor controller 1. Further, the robot controller 3 receives a result of image processing obtained by execution of the image processing (detection of the target mark 5, for example) by the visual sensor controller 1, etc.

The robot controller 3 controls drive of the arm 41 so as to move the target mark 5 attached to the end of the arm 41 in a range set in advance for calibration ("calibration range") during implementation of the calibration. Process of measuring the calibration range will be described in detail later.

The robot controller 3 measures the coordinate position of the target mark 5 in the robot coordinate system attached to the end of the arm 41 of the robot 4. Specifically, the robot controller 3 can measure the coordinate position of the target mark 5 in the robot coordinate system while the target mark 5 is at a destination.

[Visual Sensor Controller 1]

The camera 2 is connected to the visual sensor controller 1 functioning as the calibration device. The visual sensor controller 1 makes the camera 2 capture an image of the target mark 5 to calibrate the camera 2.

Figure 3:
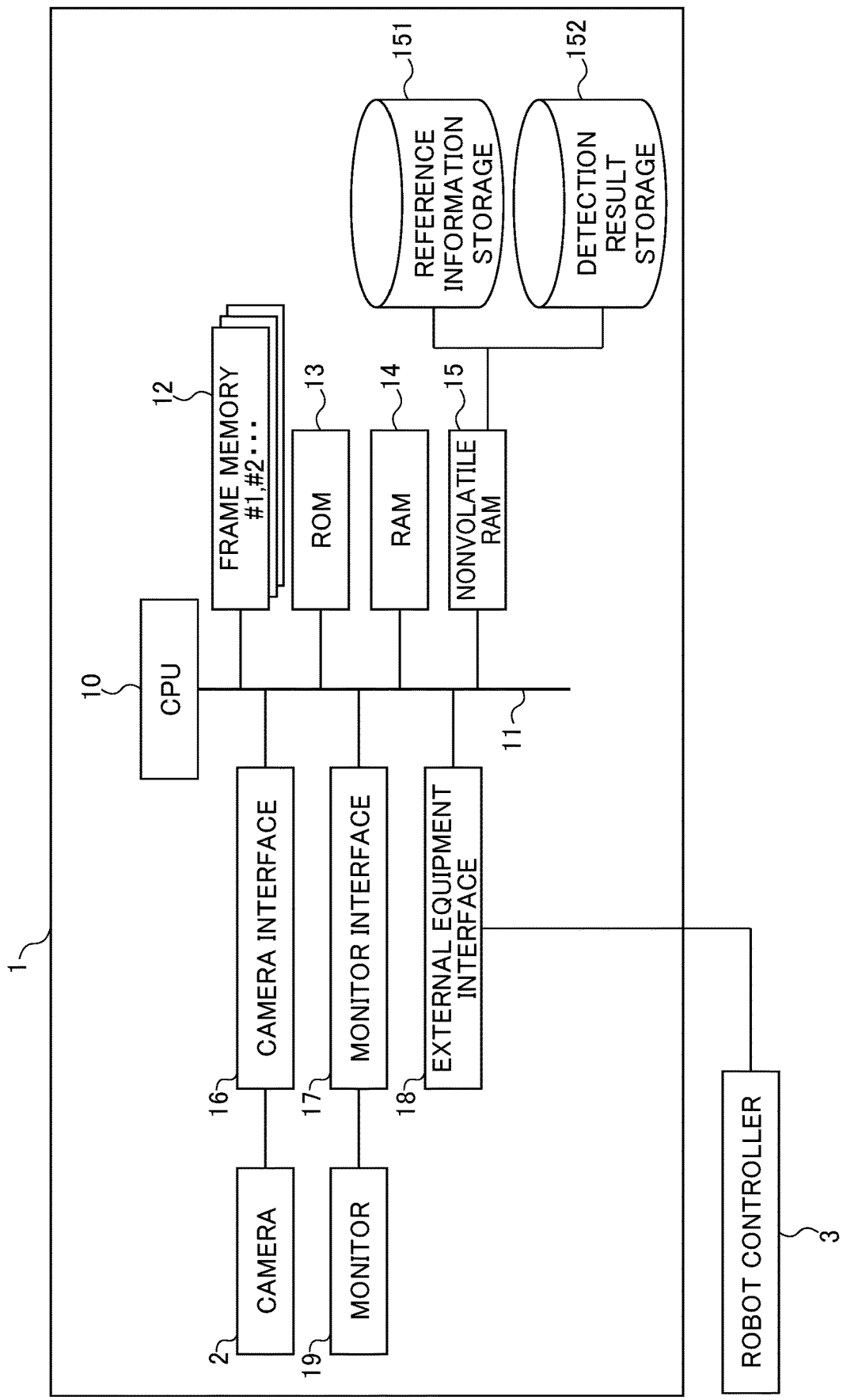
FIG. 3 is a functional block diagram showing the functional configuration of a visual sensor controller 1.

FIG. 3 is a functional block diagram showing the functional configuration of the visual sensor controller 1. The visual sensor controller 1 includes a central processing unit (CPU) 10 for controlling the visual sensor controller 1 entirely in an integrated fashion. The CPU 10 is connected through a bus 11 to multiple frame memories 12, a read-only memory (ROM) 13, a random access memory (RAM) 14, and a nonvolatile RAM 15. The camera 2 is connected to the bus 11 through a camera interface 16. Further, a monitor 19 is connected to the bus 11 through a monitor interface 17. The CPU 10 is further connected through the bus 11 to an external equipment interface 18. The external equipment interface 18 is connected to the robot controller 3 to receive the coordinate position of the target mark 5 from the robot controller 3 and transmit a result of image processing obtained by execution of the image processing (detection of the target mark 5, for example) by the visual sensor controller 1, etc. to the robot controller 3.

The ROM 13 stores programs used for execution of various types of process by the visual sensor controller 1. Generally, access is made faster to a RAM than to a ROM. Thus, the CPU 10 may develop the programs stored in the ROM 13 in advance on the RAM 14. Then, the CPU 10 may read the programs from the RAM 14 and execute the read programs. The RAM 14 stores temporarily saved data necessary for execution of the programs. The nonvolatile RAM 15 is a magnetic storage unit, a flash memory, an MRAM, FRAM (registered trademark), or an EEPROM, for example. Alternatively, the nonvolatile RAM 15 is an SRAM or a DRAM backed up by a battery, for example. The nonvolatile RAM 15 is configured as a nonvolatile memory to hold its storage state even after the visual sensor controller 1 is powered off. The nonvolatile RAM 15 stores setting necessary for execution of the programs, for example. The frame memory 12 stores image data.

[Model Pattern]

The nonvolatile RAM 15 includes a reference information storage 151 and a detection result storage 152. The reference information storage 151 stores reference information (also called a "model pattern" or a "template") indicating a subject (target mark 5). The reference information may be a group of edge points (also called an "edge point group") in a subject (target mark 5), for example. The edge point is a point where brightness changes largely in an image. For example, the edge point group may be formed by converting the subject (target mark 5) to an edge image through publicly-known Sobel filtering, and extracting a pixel (edge point) having an intensity of a predetermined threshold or more from the edge image. The edge point group extracted in this way from the image including the subject (target mark 5) to be detected is stored as the model pattern into the reference information storage 151. The model pattern is not limited to edge points. For example, feature points such as those extracted by publicly-known SIFT may be used as the model pattern. Alternatively, the model pattern may be generated by arranging a geometric graphic such as a line segment, a rectangle, or a circle so as to match the contour of the subject (target mark 5). In this case, feature points may be provided at proper intervals on the geometric graphic forming the contour. The model pattern may also be a template image generated by cutting out a part corresponding to a model pattern designation area from a captured image of the target mark 5. Storing the model pattern in advance generated in the above-described way into the reference information storage 151 is also called "teaching the model pattern." Teaching of the model pattern will be described later.

The detection result storage 152 stores a result of detection of the target mark 5 detected by using the taught model pattern from data about an image captured by the camera 2 while the target mark 5 having been moved in the set calibration range is at each destination.

In response to a command from the CPU 10, the camera 2 captures an image of the subject to acquire the image, and outputs a signal about the acquired image. The camera interface 16 has the function of generating a synchronization signal for controlling timing of exposure for the camera 2 in response to a command from the CPU 10, and the function of amplifying a signal received from the camera 2. The camera 2 and the camera interface 16 are not limited to any particular parts but are commercially-available and common-used parts.

The signal about the image taken from the camera 2 is A/D converted by the camera interface 16, and then stored temporarily as digital image data through the bus 11 into the frame memory 12. In the visual sensor controller 1, the CPU 10 processes the image by using data stored in the frame memory 12, the ROM 13, the RAM 14, and the nonvolatile RAM 15. Data resulting from the image processing is stored again into the frame memory 12. In response to a command, the CPU 10 may transfer the data stored in the frame memory 12 to the monitor interface 17 and display the data on the monitor 19 in order to allow check of the substance of the data by an operator, for example.

The external equipment interface 18 is connected to various types of external equipment. For example, the external equipment interface 18 is connected to the robot controller 3 to receive a signal for triggering image processing from the robot controller 3 and supply the robot controller 3 with position information data obtained by image processing, etc. A keyboard or a mouse may also be connected to the external equipment interface 18 as an input unit 33 for an operator, for example.

Figure 4:
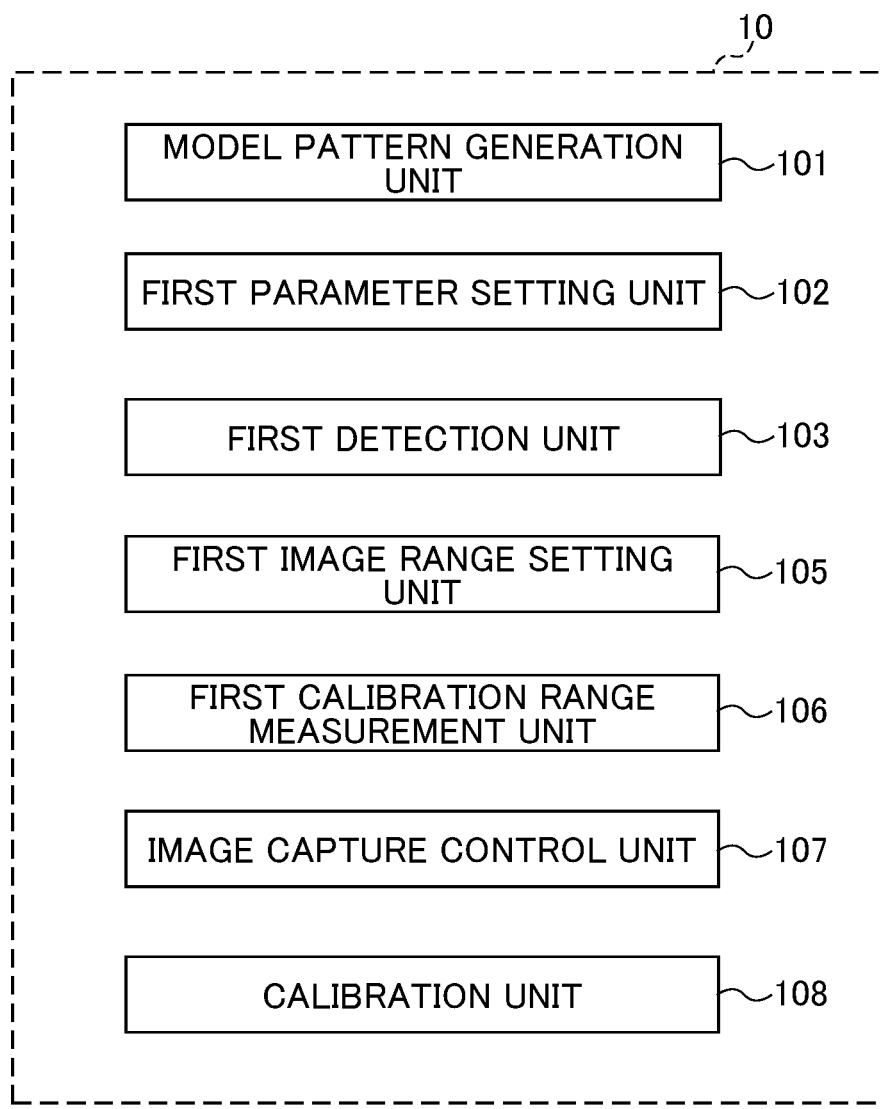
FIG. 4 is a block diagram showing the functional configuration of a CPU 10 in the visual sensor controller 1.

The function of the CPU 10 will be described next in terms of each processing unit. Description in terms of each processing step (method) will be omitted as each processing step (method) can be understood by replacing "unit" in the following description by "step." FIG. 4 is a block diagram showing the functional configuration of the CPU 10 in the visual sensor controller 1. The CPU 10 includes a model pattern generation unit 101, a first parameter setting unit 102, a first detection unit 103, a first image range setting unit 105, a first calibration range measurement unit 106, an image capture control unit 107, and a calibration unit 108. Each of these functional units and functional steps is realized by execution of a system program in the ROM 13 by the CPU 10.

[Model Pattern Generation Unit 101]

Figure 5:
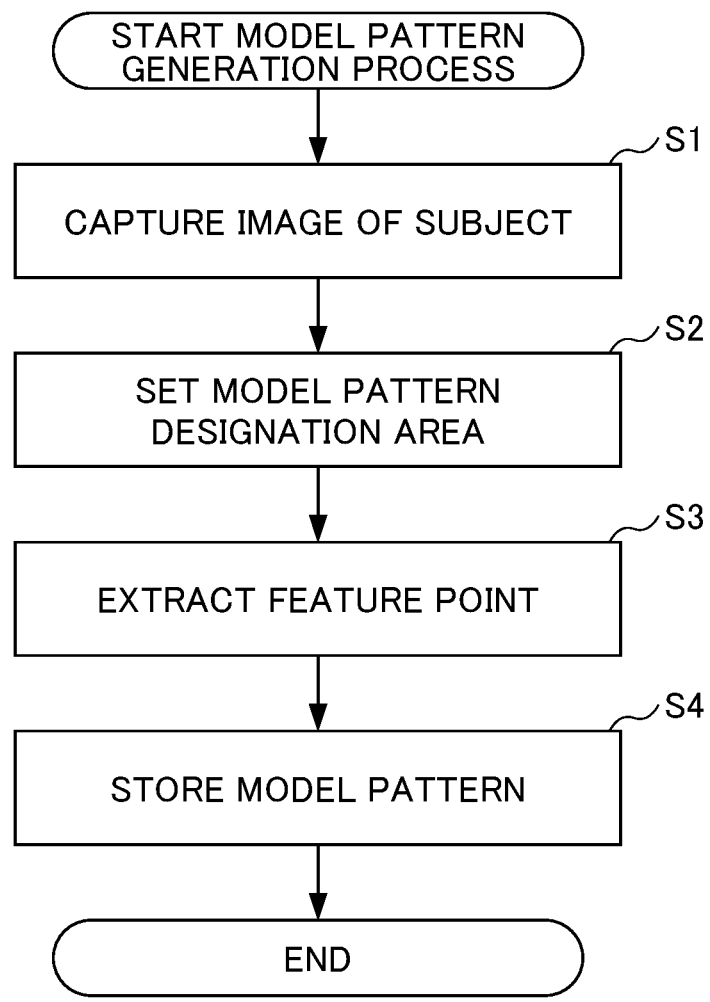
FIG. 5 shows a flowchart for generating a model pattern.

The model pattern generation unit 101 generates a model pattern by using the camera 2, for example. FIG. 5 shows a flowchart followed by the model pattern generation unit 101 for generating the model pattern. The function of the model pattern generation unit 101 will be described by referring to FIG. 5.

In step S1, the model pattern generation unit 101 exerts control to make the camera 2 capture an image of the target mark 5 arranged in the view of the camera 2. At this time, a relationship between the position of the camera 2 and that of the target mark 5 is desirably set to be the same as that during detection of the target mark 5.

Figure 6:
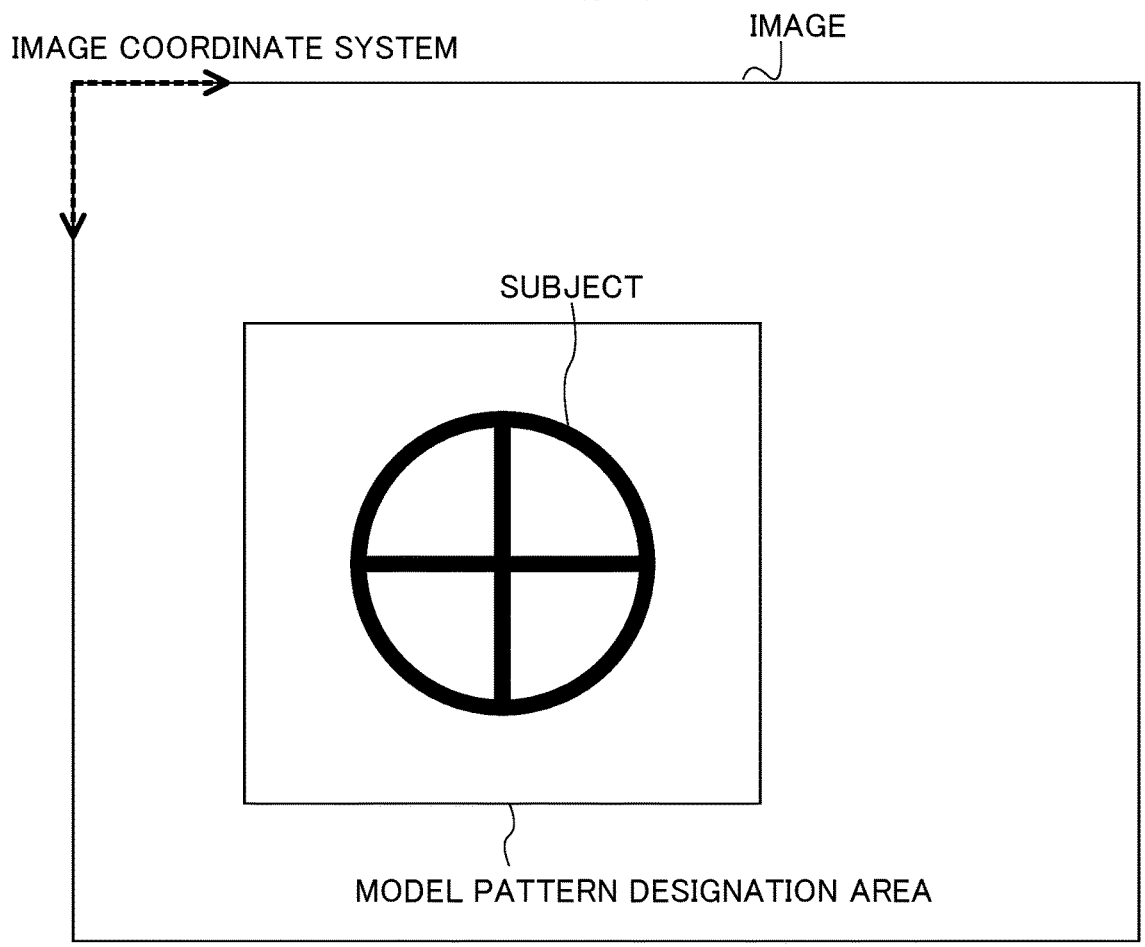
FIG. 6 shows an example of a model pattern designation area.

In step S2, the model pattern generation unit 101 sets an area in the captured image of the target mark 5 in the form of a rectangular area or a circular area, for example, as a model pattern designation area in which the target mark 5 appears. Further, the model pattern generation unit 101 defines a model pattern coordinate system (image coordinate system) in the model pattern designation area. FIG. 6 shows an example of the model pattern designation area, that of the model pattern coordinate system (image coordinate system), and that of the model pattern. The model pattern generation unit 101 may set an area instructed by an operator as the model pattern designation area. Alternatively, the model pattern generation unit 101 may determine spots of large brightness gradients in the image as the contour of the image of the target mark 5, and set the model pattern designation area so as to contain the contour of the image of the target mark 5 inside the model pattern designation area.

In step S3, the model pattern generation unit 101 extracts an edge point in the model pattern designation area as a feature point, obtains physical quantities such as the position of the edge point, the direction and the magnitude of a brightness gradient at the edge point, etc., and converts the edge point to a value expressed in the model pattern coordinate system defined in the model pattern designation area.

Figure 7:
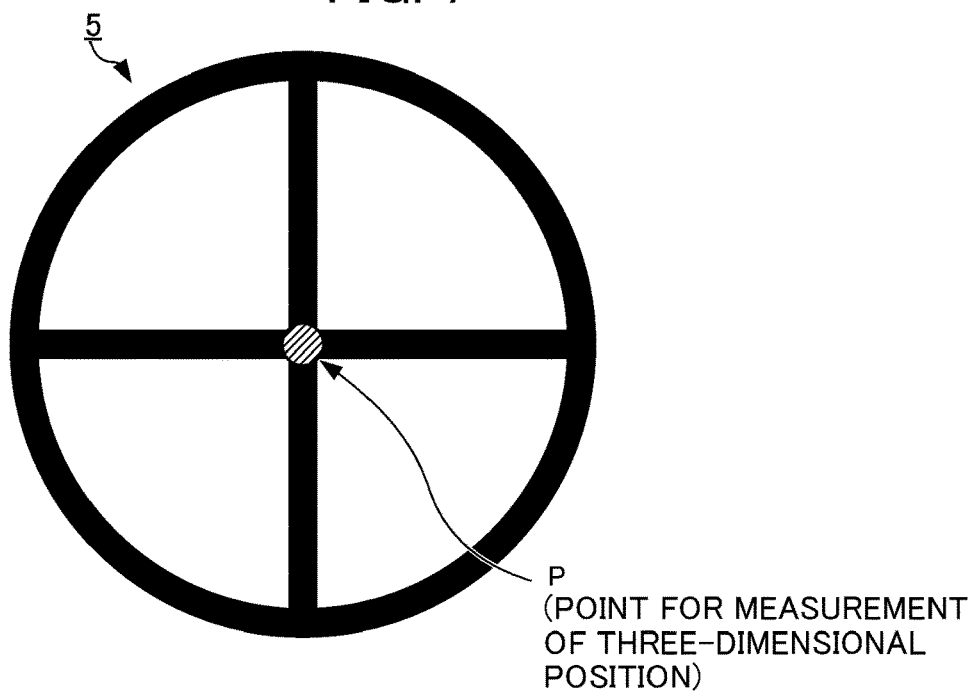
FIG. 7 shows an example of a point P where the three-dimensional position information of the target mark 5 is to be measured.

Further, the model pattern generation unit 101 sets a point instructed by the operator as the point P where the three-dimensional position information of the target mark 5 is to be measured, and stores the point P into the reference information storage 151. By designating the point P in advance where the three-dimensional position information of the target mark 5 is to be measured, the three-dimensional position information and the three-dimensional posture of the target mark 5 are determined in advance in the end point coordinate system at the robot 4. If the point P where the three-dimensional position information of the target mark 5 is to be measured is not designated explicitly, the model pattern generation unit 101 may set a center point of the model pattern as a point where the three-dimensional position information of the target mark 5 is to be measured, for example. FIG. 7 shows an example of the point P where the three-dimensional position information of the target mark 5 is to be measured. In FIG. 7, a center point of the target mark 5 is set as the point P where the three-dimensional position information of the target mark 5 is to be measured. As described above, the model pattern is not limited to edge points. For example, feature points such as those extracted by publicly-known SIFT may be used as the model pattern. Alternatively, the model pattern may be generated by arranging a geometric graphic such as a line segment, a rectangle, or a circle so as to match the contour of a subject (target mark 5) In this case, feature points may be provided at proper intervals on the geometric graphic forming the contour. The model pattern may also be a template image generated by cutting out a part corresponding to the model pattern designation area from the captured image of the target mark 5.

In step S4, the model pattern generation unit 101 stores the generated model pattern into the reference information storage 151. As described above, the model pattern is generated by using the image captured by the camera 2.

The following describes a parameter for detecting the target mark 5 from data about the image captured by the camera 2 by using the model pattern stored in the reference information storage 151.

A difference is generated in a distance between the camera 2 and the position of the target mark 5 at a destination or in an angle from an optical axis, for example. Hence, an image of the target mark 5 captured by the camera 2 may differ in a manner that depends on a destination of the target mark 5 in the calibration range from the model pattern generated by the model pattern generation unit 101 in terms of appearance such as a size or the occurrence of rotation or distortion. As a result, it is likely that, in trying to detect the target mark 5 completely matching the model pattern, it will be impossible to detect such a subject (target mark 5) from data about the image captured by the camera 2.

[First Parameter Setting Unit 102]

The first parameter setting unit 102 sets a parameter for detecting the target mark 5 from data about an image captured by the camera 2 so as to allow detection of a model pattern at any destination of the target mark 5 in the calibration range even in the above-described situation. More specifically, the parameter set by the first parameter setting unit 102 depends on a detection algorithm. For example, the parameter may be set to have a predetermined range with respect to a model in terms of a size, rotation, distortion, a position range or an angle range for detection, for example. Alternatively, the parameter may be set as a single numerical value or an on/off value. The parameter is not limited to these examples. Thus, the first detection unit 103 described later is configured to be capable of detecting the target mark 5 matching the model pattern from captured image data by using a single numerical value, an on/off value, or a parameter value in a predetermined range so as to allow detection of the model pattern at any destination of the target mark 5. By doing so, the first detection unit 103 described later becomes capable of detecting the model pattern from the captured image data by using a proper parameter value. The parameter may be a parameter to be applied to data about an image captured by the camera 2. In this case, the first detection unit 103 is configured to detect the model pattern about the target mark 5 from image data generated by applying the parameter to the data about the image captured by the camera 2. For example, the model pattern can be detected from image data generated by smoothing the image data by a Gaussian filter. The parameter may be a parameter to be applied to the model pattern about the target mark 5. In this case, the first detection unit 103 is configured to detect the target mark 5 from the data about the image captured by the camera 2 by using the model pattern to which the parameter is applied.

One example of the parameter set by the first parameter setting unit 102 and applied to the model pattern may be a transformation matrix for projection transformation, affine transformation, or homothetic transformation. For example, if a value of the parameter is set as a single numerical value, a single transformation matrix is selectable. If a value of the parameter is set to have a predetermined range, a transformation matrix of a predetermined range is selectable. The following describes specific examples applied if the parameter is set to have a predetermined range. In the case of a projection transformation matrix, the parameter may be set in such a manner that a parameter range covers a projection transformation matrix with an element having a deviation of a predetermined threshold or less from a corresponding element in a projection transformation matrix as a basis. In the case of rotation, a range for a rotation angle may be set based on one rotation angle. Likewise, in the case of homothetic transformation, a range for a homothetic ratio may be set based on one homothetic ratio. For example, based on an angle between the optical axis of the camera 2 and a plane on which the target mark 5 is to move during implementation of calibration (particularly if this plane is not at a right angle to the optical axis but is tilted diagonally from the optical axis), a size range may be set from 0.9 to 1.1 for the camera 2 by using the parameter. By doing so, robust detection can be realized on the occurrence of a difference in appearance of the target mark 5 resulting from different destinations of the target mark 5, for example. A parameter value for exposure time is desirably set in consideration of an angle between the camera 2 and a plane on which the target mark 5 is arranged or a relationship with illumination, for example.

[First Detection Unit 103]

The first detection unit 103 detects the target mark 5 from the data about the image captured by the camera 2, and measures the coordinate position of the detected target mark 5 in an image coordinate system at the camera 2. More specifically, the first detection unit 103 selects a parameter from a single numerical value, an on/off value, or a predetermined range for the parameter. In selecting the parameter from the predetermined range, a center value in the parameter range may be selected first, for example. Then, a value shifted in the plus or minus direction from the center value may be selected as a next parameter, for example.

If the parameter is a parameter to be applied to the data about the image captured by the camera 2 as described above, after the first detection unit 103 selects the parameter from a single numerical value, an on/off value, or a predetermined range for the parameter, the first detection unit 103 converts the data about the image captured by the camera 2 by using the selected parameter so as to allow detection of the target mark 5 from the image data. In this way, the first detection unit 103 can detect the target mark 5 from the converted image data by the publicly-known detection technique.

More specifically, the first detection unit 103 extracts a feature point from the image data to which the parameter is applied by the same method as applied for extracting a feature point from the taught model pattern, and conducts publicly-known matching between a feature point resulting from the conversion with the parameter and a feature point forming the model pattern, thereby detecting the target mark 5.

Conversely, the first detection unit 103 may convert the model pattern about the target mark 5 by using the selected parameter. In this case, the first detection unit 103 can detect the target mark 5 matching the converted model pattern from the captured image data by the above-described publicly-known detection technique. More specifically, the first detection unit 103 extracts a feature point from the data about the image captured by the camera 2 by the same method as applied for extracting a feature point from the taught model pattern, and conducts publicly-known matching between the extracted feature point and a feature point in the model pattern to which the parameter is applied, thereby detecting the target mark 5. The first detection unit 103 measures the coordinate position of the detected target mark 5 in the image coordinate system at the camera 2.

[First Image Range Setting Unit 105]

As described above, in this embodiment, the target mark 5 is moved on a plane designated in advance. This plane may include multiple parallel planes or may be formed by coupling multiple partial planes. To determine an operation range for the robot 4 (calibration range), the first image range setting unit 105 sets an image range in the image coordinate system at the camera 2 corresponding to this calibration range. More specifically, in response to an instruction from an operator, the first image range setting unit 105 sets an image range in the image captured by the camera 2 based on the image coordinate system at the camera 2. In this case, the first image range setting unit 105 can designate the image range as a rectangular range, for example. The first image range setting unit 105 may set the image entirely as the image range. If space for move of the target mark 5 includes an obstacle, for example, the first image range setting unit 105 may limit the image range in response to an instruction from the operator so as to avoid the obstacle existing in the view of the camera 2. In this case, the first image range setting unit 105 may designate the image range as a closed graphic drawn with multiple line segments.

[First Calibration Range Measurement Unit 106]

The first calibration range measurement unit 106 measures a calibration range (a coordinate position in the robot coordinate system showing a boundary of the calibration range, for example) as an operation range for the robot 4 corresponding to the image range set by the first image range setting unit 105 before implementation of calibration by controlling the robot 4 so as to move the target mark 5 and making the first detection unit 103 detect the target mark 5. More specifically, the first calibration range measurement unit 106 determines whether or not the target mark 5 is detectable in the image range designated in the image coordinate system at the camera 2 by the first image range setting unit 105 by moving the target mark 5 and detecting the target mark 5 repeatedly, thereby measuring a calibration range (a coordinate position in the robot coordinate system showing a boundary of the calibration range, for example) as an operation range for the robot 4 (specifically, target mark 5) corresponding to the designated image range.

Figure 8A:
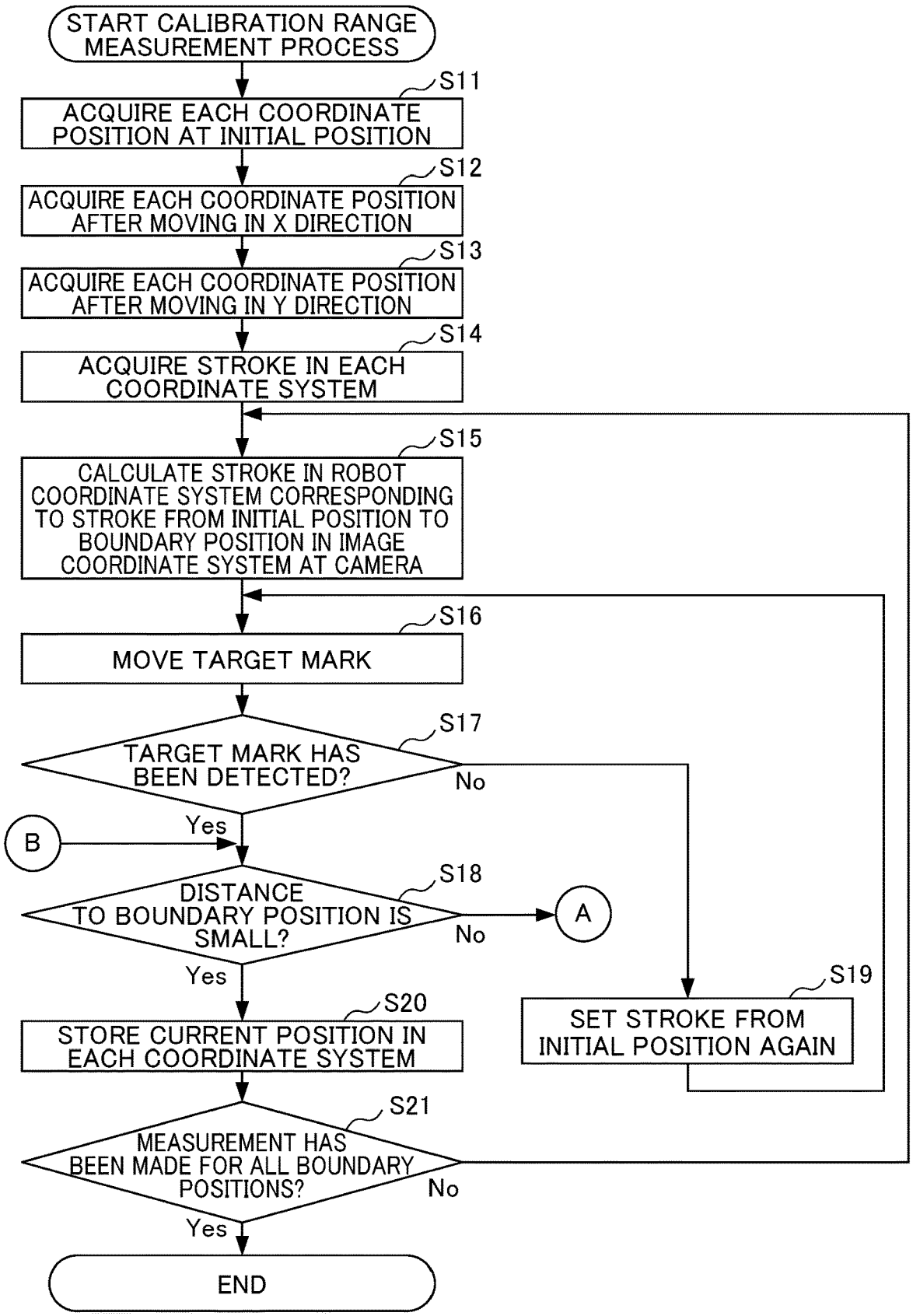
FIG. 8A shows a flowchart showing a flow followed by a first calibration range measurement unit 106 for measuring a coordinate position information in a robot coordinate system showing a boundary of a calibration range.
Figure 8B:
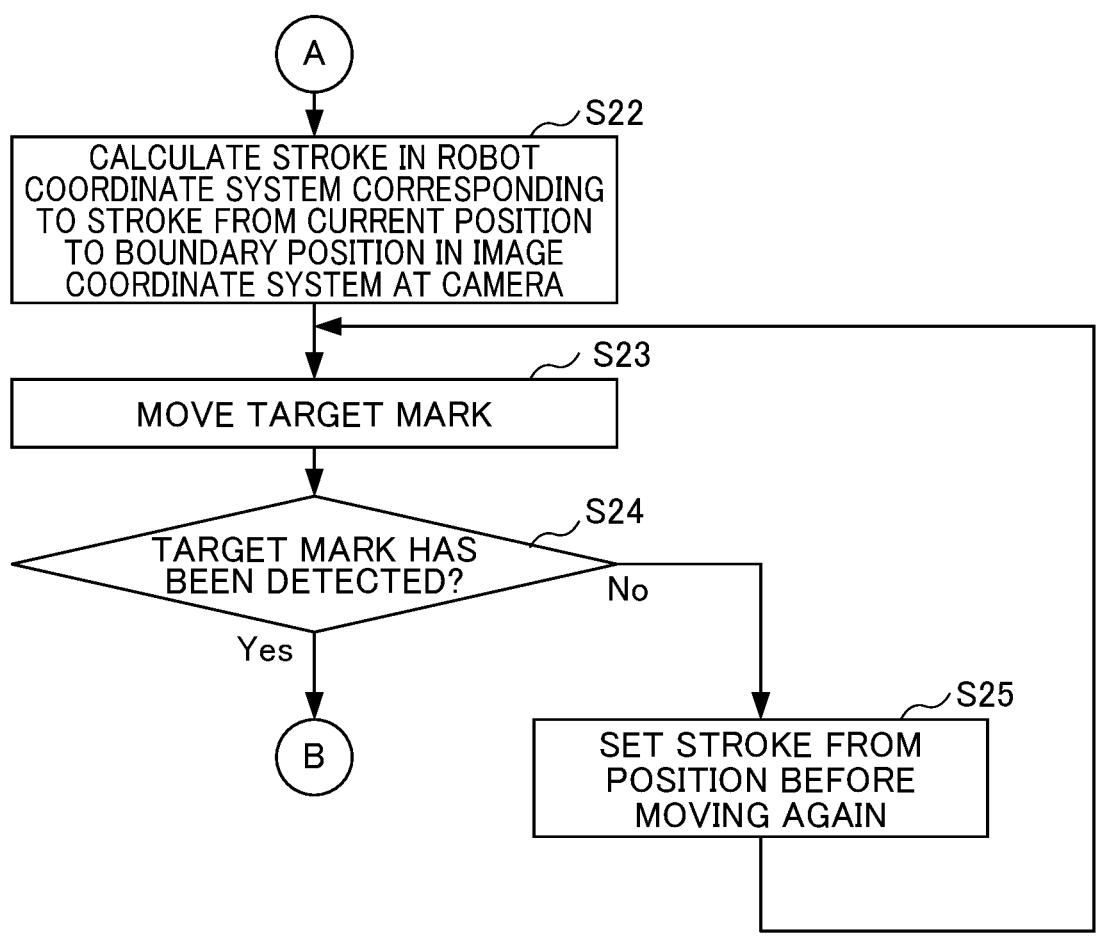
FIG. 8B shows a flowchart showing the flow followed by the first calibration range measurement unit 106 for measuring the coordinate position information in the robot coordinate system showing the boundary of the calibration range.

FIGS. 8A and 8B show flowcharts showing a flow followed by the first calibration range measurement unit 106 for measuring a coordinate position in the robot coordinate system showing a boundary of a calibration range. The function of the first calibration range measurement unit 106 will be described by referring to FIGS. 8A and 8B. A plane on which the target mark 5 is to be moved during implementation of calibration is defined as an XY plane in a three-dimensional coordinate system designated in advance. However, this plane is not limited to the XY plane in the three-dimensional coordinate system.

In step S11, the first calibration range measurement unit 106 acquires the three-dimensional coordinate position of the target mark 5 in the robot coordinate system arranged at an initial position on a plane in the view of the camera 2 and the coordinate position of this target mark 5 in the image coordinate system at the camera 2 through the robot controller 3 and the first detection unit 103 respectively. The target mark 5 may be moved to the initial position in response to jog operation by an operator, for example. Alternatively, the target mark 5 may be moved to an initial position stored in the robot controller 3.

In step S12, the first calibration range measurement unit 106 moves the robot 4 (specifically, target mark 5) through the robot controller 3 on the plane from the initial position by a unit stroke in an X direction set in advance in an X-axis direction. Then, the first calibration range measurement unit 106 acquires the three-dimensional coordinate position of the target mark 5 in the robot coordinate system and the coordinate position of the target mark 5 in the image coordinate system at the camera 2 through the robot controller 3 and the first detection unit 103 respectively.

In step S13, the first calibration range measurement unit 106 moves the robot 4 (specifically, target mark 5) through the robot controller 3 on the plane from the initial position by a unit stroke in a Y direction set in advance in a Y-axis direction. Then, the first calibration range measurement unit 106 acquires the three-dimensional coordinate position of the target mark 5 in the robot coordinate system and the coordinate position of the target mark 5 in the image coordinate system at the camera 2 through the robot controller 3 and the first detection unit 103 respectively.

In step S14, the first calibration range measurement unit 106 calculates a three-dimensional vector VX (magnitude and direction) in the robot coordinate system corresponding to the X-direction unit stroke in the X-axis direction on the plane, and a two-dimensional vector vx (magnitude and direction) in the image coordinate system at the camera 2 showing the stroke of the target mark 5. The first calibration range measurement unit 106 further calculates a three-dimensional vector VY (magnitude and direction) in the robot coordinate system corresponding to the Y-direction unit stroke in the Y-axis direction on the plane, and a two-dimensional vector vy (magnitude and direction) in the image coordinate system at the camera 2 showing the stroke of the target mark 5. By doing so, the first calibration range measurement unit 106 can acquire approximate association between the stroke in the image coordinate system at the camera 2 and the stroke in the robot coordinate system. For example, the first calibration range measurement unit 106 can convert a position information in the image coordinate system to an approximate position information in the robot coordinate system by using a transformation matrix R calculated based on the following formula (1):

$$R = [VX \ VY \ 0] \begin{bmatrix} vx & vy & 0 \\ 0 & 0 & 1 \end{bmatrix}^{-1} \quad \text{[Formula 1]}$$

Regarding move by the Y-direction unit stroke set in advance in the Y-axis direction in step S13, a start point for the vector is not limited to the initial position. The vector may be started from a point to which the robot 4 has been moved from the initial position by the X-direction unit stroke in step S12.

In step S15, based on the association calculated in step S14, the first calibration range measurement unit 106 calculates and sets the magnitude and the direction (V) of the stroke in the robot coordinate system from the initial position on the plane corresponding to the magnitude and the direction (v) of the stroke in the image coordinate system at the camera 2 from the initial position to a boundary position (corner, for example) in the image coordinate system at the camera 2. At this time, the magnitude and the direction (V) are desirably set so as to increase the probability of detection of the target mark 5 in a range in the image coordinate system at the camera 2 by being multiplied by a factor less than 1. Coordinate values in the image range in the image coordinate system at the camera 2 (boundary positions including four corners, for example) are calculated in advance.

In step S16, the first calibration range measurement unit 106 moves the target mark 5. More specifically, based on the set magnitude and the set direction (V) of the stroke, the first calibration range measurement unit 106 moves the robot 4 (specifically, target mark 5) through the robot controller 3 from the initial position on the plane.

In step S17, the first calibration range measurement unit 106 determines through the first detection unit 103 whether or not the target mark 5 is detectable. If the target mark 5 has been detected successfully (Yes), the flow goes to step S18. If the target mark 5 has not been detected successfully (No), the flow goes to step S19.

In step S18, the first calibration range measurement unit 106 determines through the first detection unit 103 whether or not a distance from the coordinate position of the target mark 5 in the image coordinate system at the camera 2 to the boundary position (corner, for example) in the image coordinate system at the camera 2 is small (specifically, whether or not the distance is a predetermined threshold or less). If the distance is determined to be small (Yes), the flow goes to step S20. If the distance is determined not to be small (No), the flow goes to step S22.

In step S19, the first calibration range measurement unit 106 sets the magnitude and the direction of the stroke again. More specifically, if the first calibration range measurement unit 106 determines that the target mark 5 has not been detected successfully during move from the initial position, the first calibration range measurement unit 106 multiplies the set magnitude and the set direction (V) of the stroke by a factor less than 1, thereby setting the magnitude and the direction (V) of the stroke again. The factor used in this step should be lower than the factor having been applied to the move from the initial position. Then, the flow goes to step S16.

In step S20, the first calibration range measurement unit 106 stores a current position information of the target mark 5 in the robot coordinate system and a current position information of the target mark 5 in the image coordinate system at the camera 2.

In step S21, the first calibration range measurement unit 106 determines whether or not measurement has been made for all the boundary positions. If measurement has been made for all the boundary positions (Yes), the flow ends. If there is a boundary position to be subject to next measurement (if No), the flow goes to step S15.

In step S22, the first calibration range measurement unit 106 sets the magnitude and the direction (V') of the stroke from the current position on the plane in the robot coordinate system corresponding to the magnitude and the direction (v') of the stroke from the current position to the boundary position.

In step S23, based on the set magnitude and the set direction (V') of the stroke from the current position, the first calibration range measurement unit 106 moves the robot 4 (specifically, target mark 5).

In step S24, the first calibration range measurement unit 106 determines through the first detection unit 103 whether or not the target mark 5 is detectable. If the target mark 5 has been detected successfully (Yes), the flow goes to step S18. If the target mark 5 has not been detected successfully (No), the flow goes to step S25.

Figure 9A:
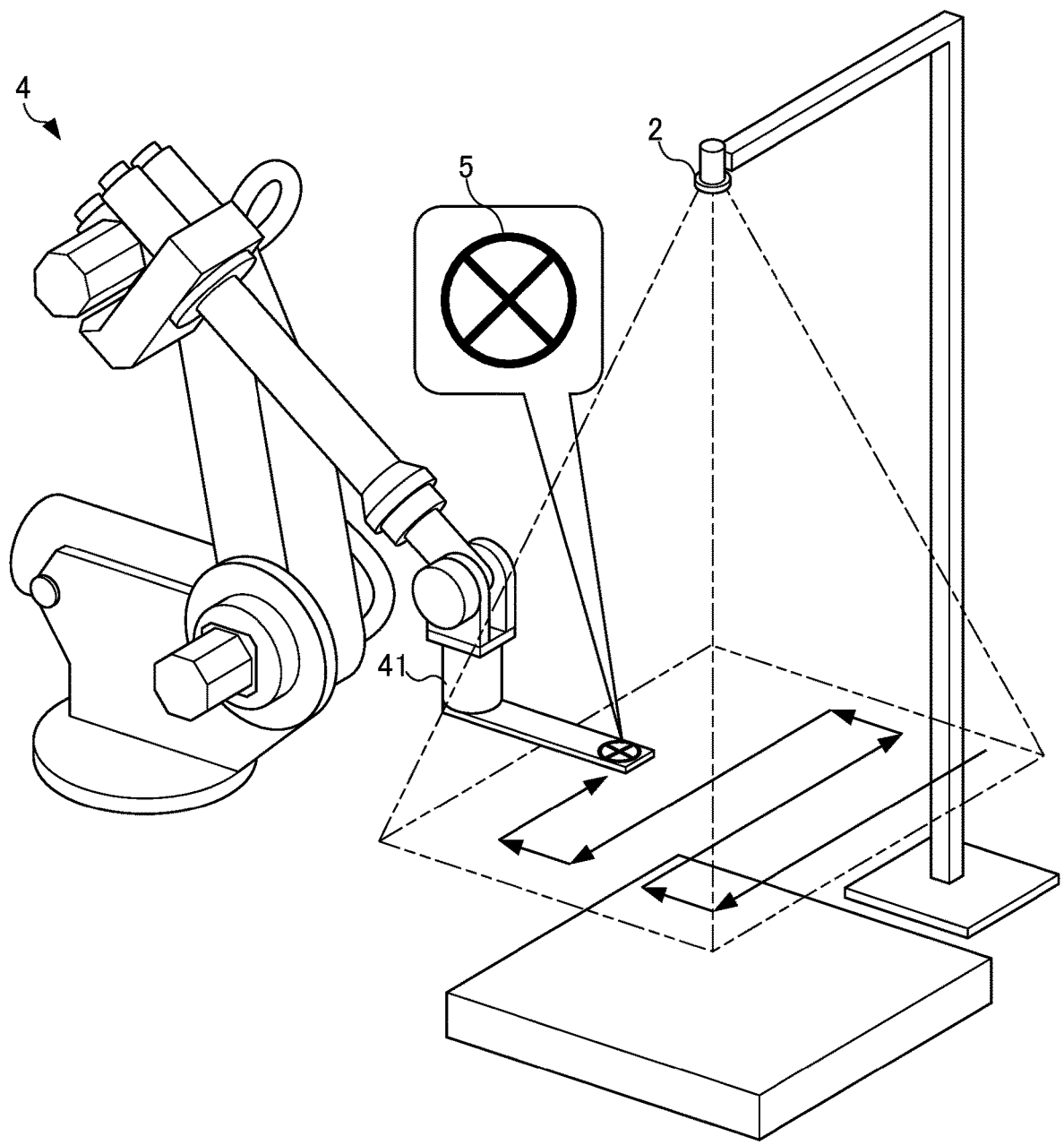
FIG. 9A shows an example of a path traced by the target mark 5 attached to an end portion of an arm 41 while the target mark 5 is moved in a calibration range.
Figure 9B:
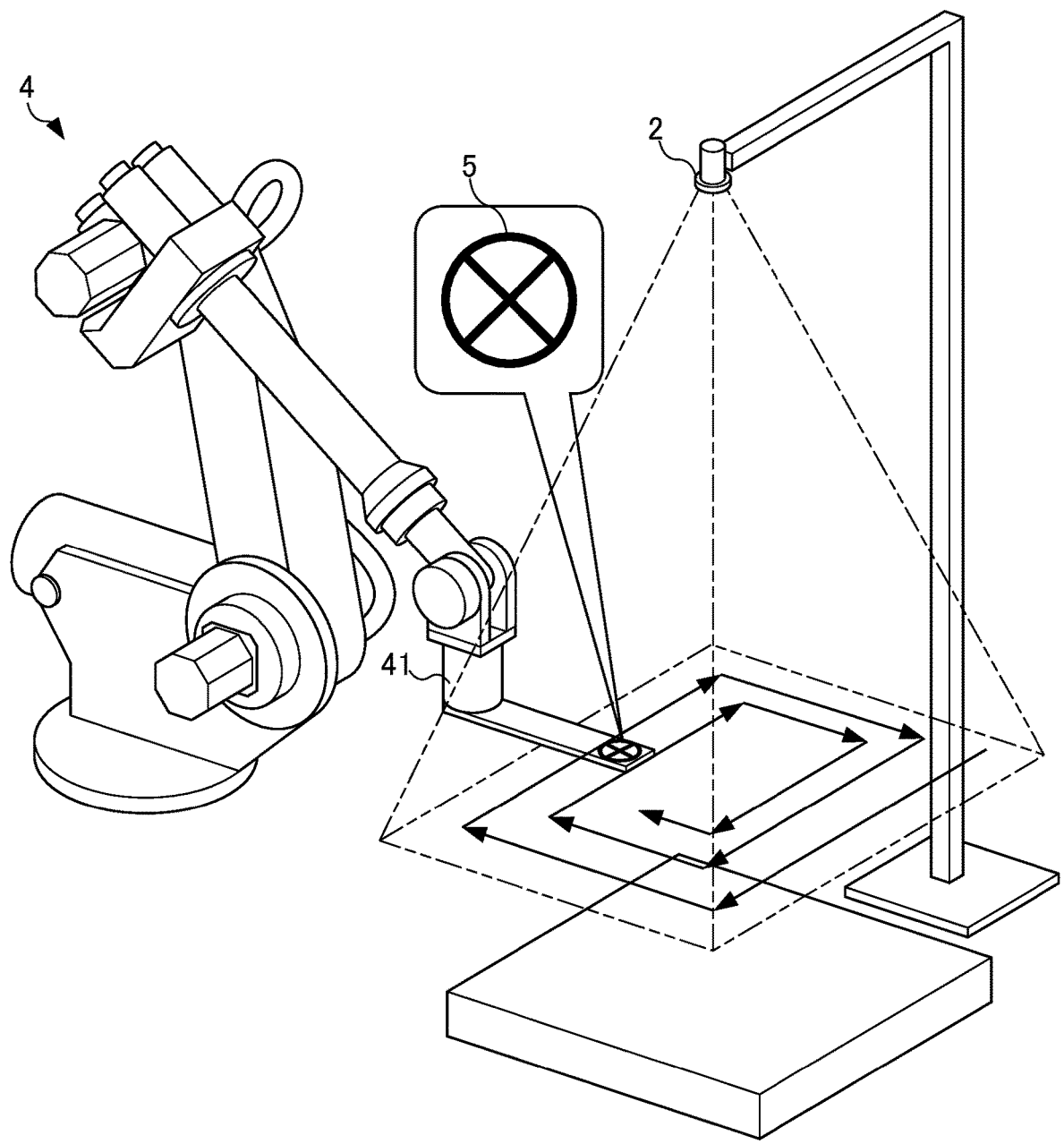
FIG. 9B shows an example of a path traced by the target mark 5 attached to the end portion of the arm 41 while the target mark 5 is moved in the calibration range.

In step S25, the first calibration range measurement unit 106 multiplies the set magnitude and the set direction (V') of the stroke by a factor less than 1, thereby setting the magnitude and the direction (V') of the stroke again from a position where the robot 4 existed before moving. The factor used in this step should be lower than the factor having been applied to the move from the position where the robot 4 existed before moving. Then, the flow goes to step S23. As described above, the first calibration range measurement unit 106 can measure a coordinate position in the robot coordinate system showing a boundary of a calibration range in which the target mark 5 is to be detected. The above-described flowchart is not restrictive but has been described as an example. During implementation of calibration, the visual sensor controller 1 functioning as the calibration device controls the robot 4 so as to move the target mark 5 in the calibration range. At this time, the arm 41 desirably moves through the set calibration range uniformly. For example, the visual sensor controller 1 may control the robot 4 in such a manner that the target mark 5 moves by tracing a path shown in FIG. 9A or 9B.

[Image Capture Control Unit 107]

The image capture control unit 107 makes the camera 2 capture an image of the target mark 5 attached to the end of the arm 41 of the robot 4 and moved by the robot 4 in a calibration range at each of multiple destination positions during implementation of calibration. The number of the destinations is desirably set to be larger than a number minimum for allowing calibration (a desired number is 20 or more, for example). By doing so, calibration can be performed more precisely.

[Calibration Unit 108]

The calibration unit 108 stores the following coordinate positions into the detection result storage 152 at each of multiple destinations of the target mark 5 attached to the end of the arm 41 of the robot 4 and moved by the robot controller 3 during implementation of calibration: the coordinate position of the target mark 5 in the image coordinate system at the camera 2 appearing in data about an image captured by the camera 2; and the coordinate position of the target mark 5 in the robot coordinate system while the image of the target mark 5 is captured by the camera 2. Then, the calibration unit 108 calibrates the camera 2 based on the coordinate position of the target mark 5 in the image coordinate system at the camera 2 stored in the detection result storage 152, and the coordinate position of the target mark 5 in the robot coordinate system while the image of the target mark 5 is captured by the camera 2 stored in the detection result storage 152.

Figure 10:
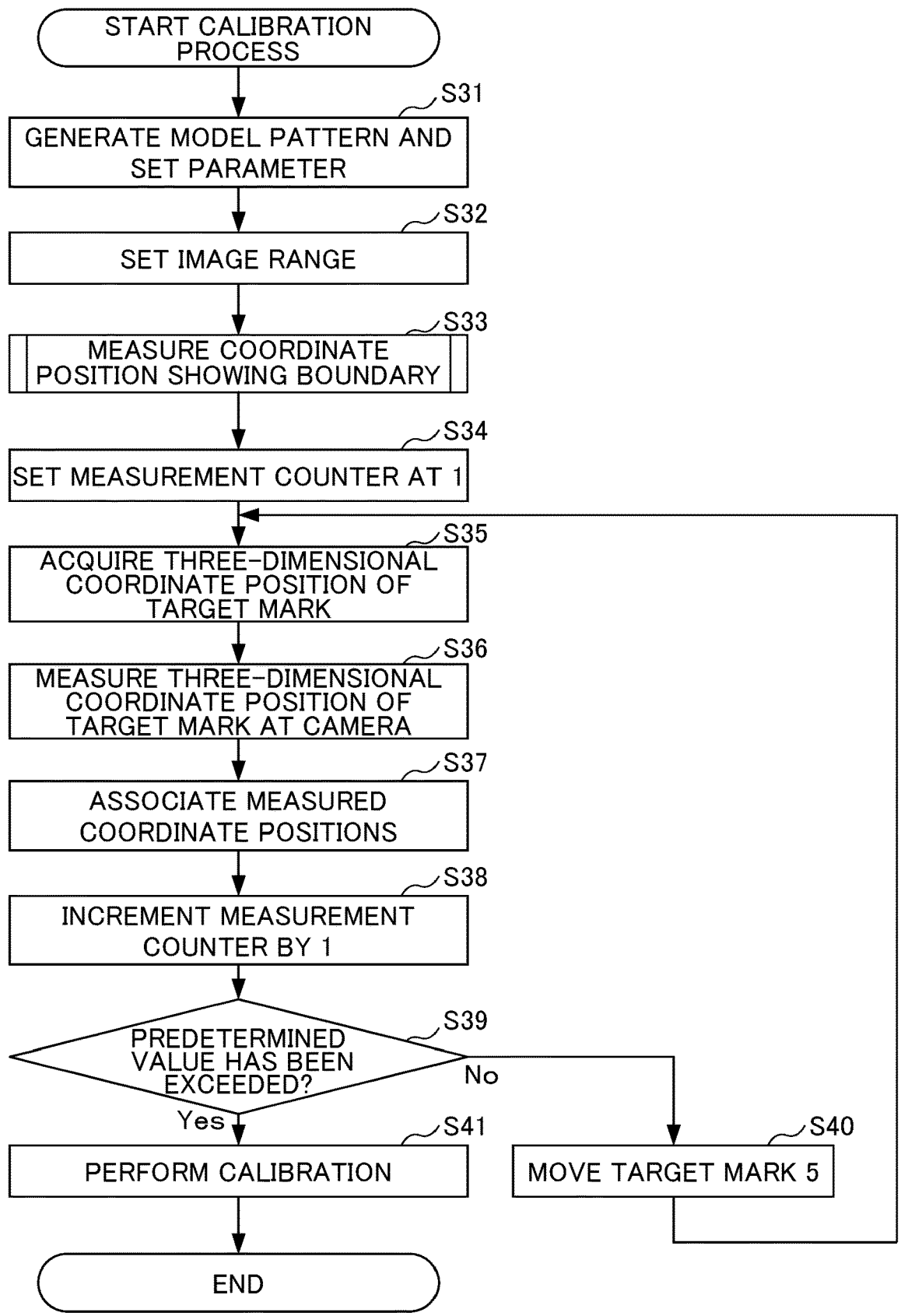
FIG. 10 is a flowchart showing calibration process on a camera 2 according to a first embodiment.

FIG. 10 is a flowchart showing calibration process on the camera 2 executed by the visual sensor controller 1 (CPU 10) according to this embodiment.

In step S31, a model pattern is generated and a parameter is set.

In step S32, the CPU 10 (first image range setting unit 105) sets an image range (corresponding to a calibration range) for the camera 2 in the image coordinate system in response to designation by an operator. The operator can designate the image range (corresponding to the calibration range) in an image captured by the camera 2.

In step S33, the first calibration range measurement unit 106 measures a coordinate position in the robot coordinate system showing a boundary of the calibration range. More specifically, as described above, the first calibration range measurement unit 106 determines whether or not the target mark 5 is detectable in the image range by moving the target mark 5 and detecting the target mark 5 repeatedly, thereby measuring the calibration range (a coordinate position in the robot coordinate system showing a boundary of an operation range for the robot 4, for example). (The process in step S33 is performed based on the above-described process flow followed by the first calibration range measurement unit 106.)

In step S34, the CPU 10 (calibration unit 108) sets a measurement counter for counting the number of times measurement is made at 1.

In step S35, the CPU 10 (calibration unit 108) acquires the three-dimensional coordinate position of the target mark 5 in the robot coordinate system measured by the robot controller 3.

In step S36, the CPU 10 (first detection unit 103) detects the target mark 5 from data about the image captured by the camera 2, and measures the coordinate position of the detected target mark 5 in the image coordinate system at the camera 2.

In step S37, the CPU 10 (calibration unit 108) stores the three-dimensional coordinate position of the target mark 5 in the robot coordinate system and the coordinate position of the target mark 5 in the image coordinate system at the camera 2 in association with each other while the target mark 5 is at a current position.

In step S38, the CPU 10 (calibration unit 108) increments the measurement counter for counting the number of times measurement is made by 1.

In step S39, it is determined whether or not the measurement counter exceeds a predetermined value. If the measurement counter exceeds the predetermined value (Yes), the flow goes to step S41. If the measurement counter does not exceed the predetermined value (No), the flow goes to step S40.

In step S40, the robot controller 3 moves the target mark 5 attached to the end of the arm 41 of the robot 4 to a place in the calibration range where the target mark 5 can be measured from the camera 2. Then, the flow goes to step S35.

In step S41, the CPU 10 (calibration unit 108) calibrates the camera 2 based on the association stored in step S37 between the three-dimensional coordinate position of the target mark 5 in the robot coordinate system and the coordinate position of the target mark 5 in the image coordinate system at the camera 2.

This process flow is not restrictive but has been described as an example.

As described above, the visual sensor controller 1 of the first embodiment includes: the first image range setting unit 105 that sets an image range in the image coordinate system at the camera 2; and the first calibration range measurement unit 106 that measures a calibration range as an operation range for the robot 4 corresponding to the set image range before implementation of calibration by controlling the robot 4 to move the target mark 5 and detecting the target mark 5. In this way, an operation range for the robot 4 (calibration range) corresponding to a range of move of the target mark 5 is measured in advance before implementation of calibration based on a view range for a single visual sensor, so that the calibration can be performed with an increased degree of freedom. Further, the target mark 5 is allowed to move in a range covering the view of the camera 2 entirely, so that the calibration can be performed more precisely. If a plane on which the target mark 5 is to move includes an obstacle, for example, an image range is designated in response to an instruction from an operator so as to avoid the obstacle existing in the view of the camera 2. By doing so, the calibration range can be set efficiently.

Figure 11A:
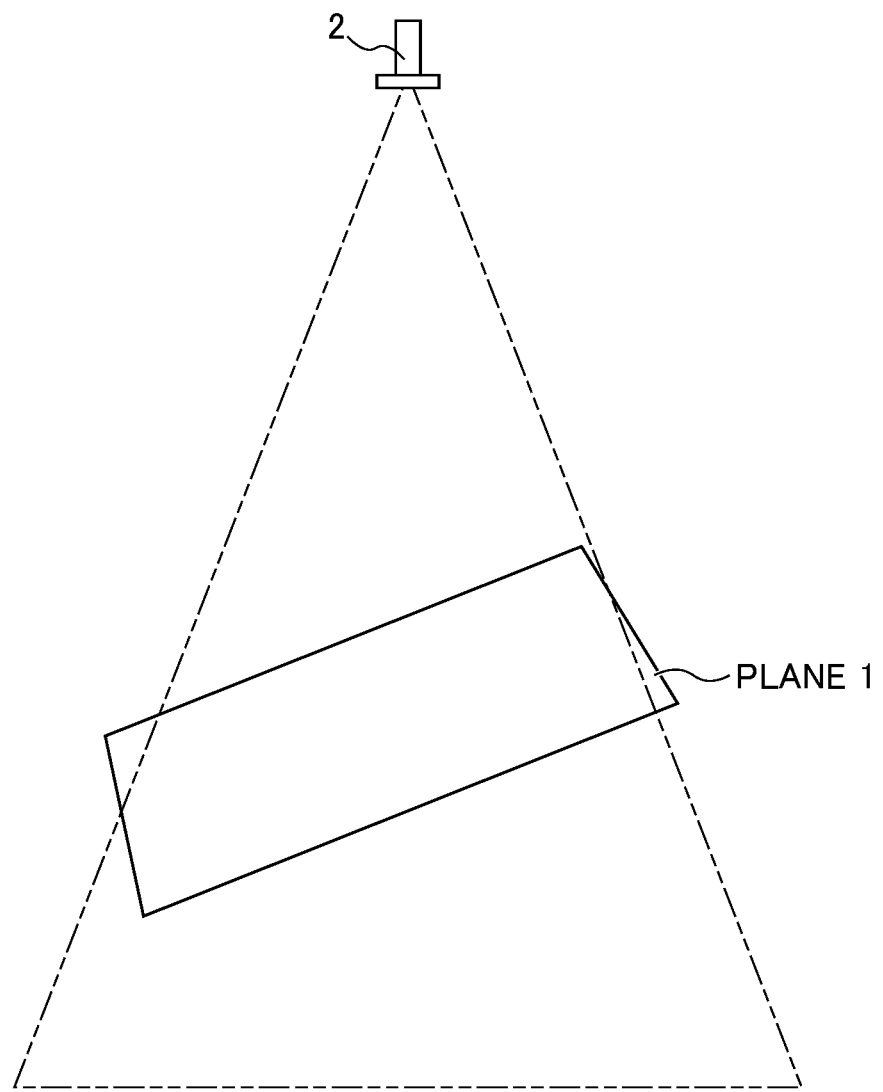
FIG. 11A shows an example of a plane on which a calibration range is set.

A calibration range can be set on a plane. The plane on which the target mark 5 is to be moved during implementation of calibration can be a plane vertical to the optical axis of the camera 2 or a plane tilted from the optical axis of the camera 2 as shown in FIG. 11A. Further, as shown in FIG. 11B, a calibration range can be set on each of at least two planes. A calibration range can be extended by making such settings. This increases the degree of freedom further in calibration, so that the calibration is performed more precisely.

A calibration method of the first embodiment and a program of the first embodiment achieve effects comparable to those achieved by the visual sensor controller 1 of the first embodiment.

The first embodiment of the present invention has been described, but the present invention is not limited to the above-described first embodiment. The effects described in the first embodiment are merely a list of most preferred effects resulting from the present invention. Effects achieved by the present invention are not limited to those described in the first embodiment.

[First Modification]

In the first embodiment, the model pattern generation unit 101 is configured to generate a model pattern by using the camera 2 and store the generated model pattern. Instead of being configured to generate a model pattern by using the camera 2, the model pattern generation unit 101 may be configured to use an existing shape (a shape such as a circle, for example) as the target mark 5.

[Second Modification]

In the first embodiment, the target mark 5 is moved on a plane designated in advance and a calibration range is measured on this plane. Alternatively, the calibration range may be defined in any three-dimensional space. This is expected to increase the degree of freedom further in calibration. For example, the plane to be designated in advance may include multiple parallel planes or may be formed by coupling multiple partial planes. As shown in FIG. 11B, for example, the plane to be designated may include at least two planes. If the plane includes multiple planes, the first calibration range measurement unit 106 measures a coordinate position in the robot coordinate system showing a boundary of a calibration range on each of the planes. As another example, two planes may be defined in a three-dimensional coordinate system. A calibration range may be set as space inside a hexahedron defined by a point of intersection between each plane and a line of sight pointing to a corner in an image captured by the camera 2. In this case, the first calibration range measurement unit 106 measures a coordinate position in the robot coordinate system showing a boundary of a calibration range in this hexahedron.

Second Embodiment

A second embodiment will be described next. In the second embodiment, a visual sensor controller 1A functioning as a calibration device sets a calibration range as an operation range for a robot 4 for allowing image capture of a target mark 5 in an image range for a stereo camera 2A including at least a first camera 21 and a second camera 22 after the target mark 5 is moved. The description of the second embodiment does not cover structures and functions common to those of the first embodiment but is directed to issues peculiar to the second embodiment.

Figure 12:
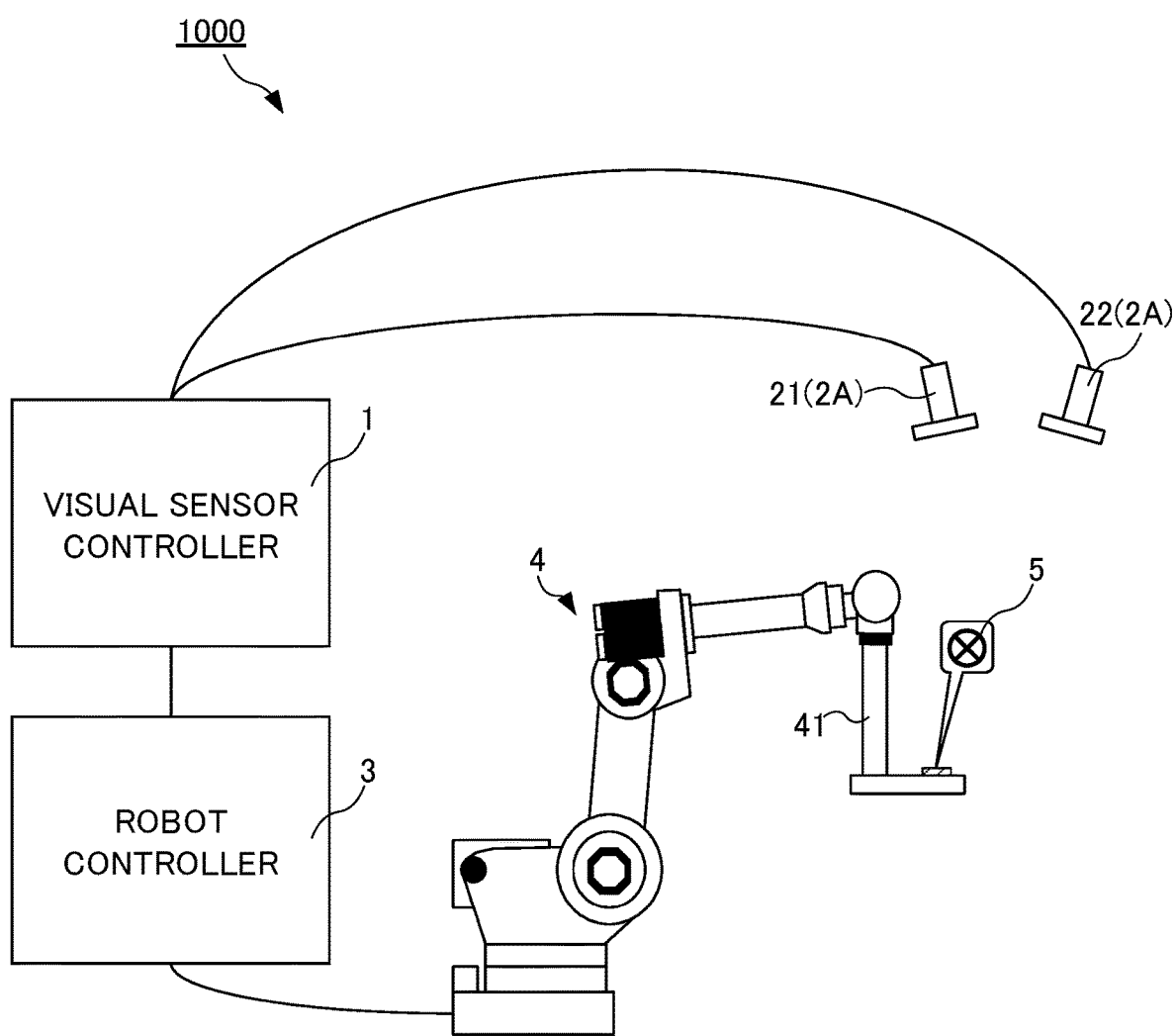
FIG. 12 shows the configuration of a robot system 1000 entirely for performing calibration by using a stereo camera 2A according to a second embodiment.
Figure 13A:
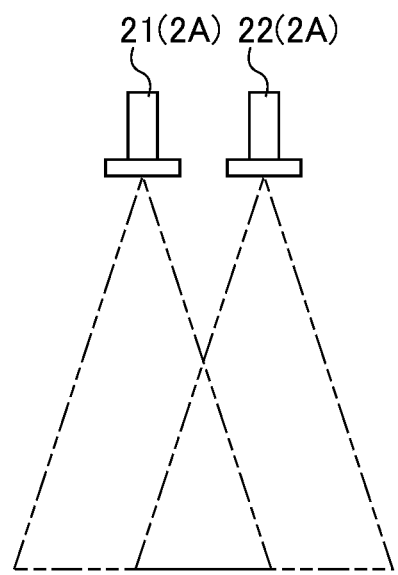
FIG. 13A shows an example of arrangement of the stereo camera 2A.
Figure 13B:
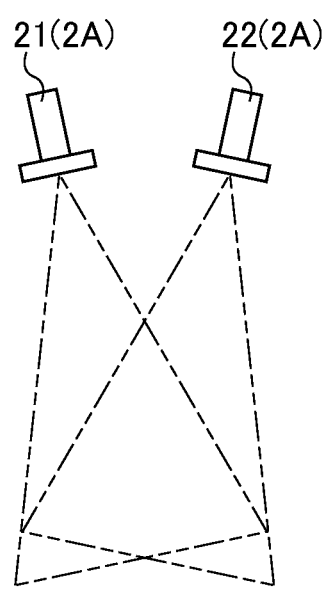
FIG. 13B shows an example of arrangement of the stereo camera 2A.

FIG. 12 shows the configuration of a robot system 1000 entirely for calibration on a stereo camera. The robot system 1000 is for performing calibration using the stereo camera 2A with the first camera 21 and the second camera 22. The number of cameras forming the stereo camera 2A is not limited to two but can be any number of two or more. Each of the cameras forming the stereo camera 2A is certainly applicable as a single camera. The stereo camera 2A is fixed to a pedestal (not shown in the drawings). As shown in FIG. 13A, the first camera 21 and the second camera 22 may be arranged parallel to each other. As shown in FIG. 13B, each of the first camera 21 and the second camera 22 may be arranged at a tilt. Tilting each of the first camera 21 and the second camera 22 makes it possible to increase an area of an overlap between an area of image captured by the first camera 21 and an area of image captured by the second camera 22, compared to arranging the first camera 21 and the second camera 22 parallel to each other. Specifically, tilting each of the first camera 21 and the second camera 22 makes it possible to increase an area where three-dimensional measurement is allowed by the stereo camera 2A, compared to arranging the first camera 21 and the second camera 22 parallel to each other. The first camera 21 and the second camera 22 desirably have the same configuration in terms of a view range, a lens, etc. By doing so, the first camera 21 and the second camera 22 are expected to catch the target mark 5 in the same way.

[Visual Sensor Controller 1A]

The stereo camera 2A is connected to the visual sensor controller 1A. The visual sensor controller 1A makes the first camera 21 and the second camera 22 capture images of the target mark 5, and calibrates each of the first camera 21 and the second camera 22.

The functional configuration of the visual sensor controller 1A functioning as the calibration device is the same as the functional configuration of the visual sensor controller 1 of the first embodiment (FIG. 3), except that the stereo camera 2A (first camera 21 and second camera 22) is connected to the bus 11 through the camera interface 16. The functional configuration of the visual sensor controller 1A can be understood by referring to FIG. 3 mentioned above.

Figure 14:
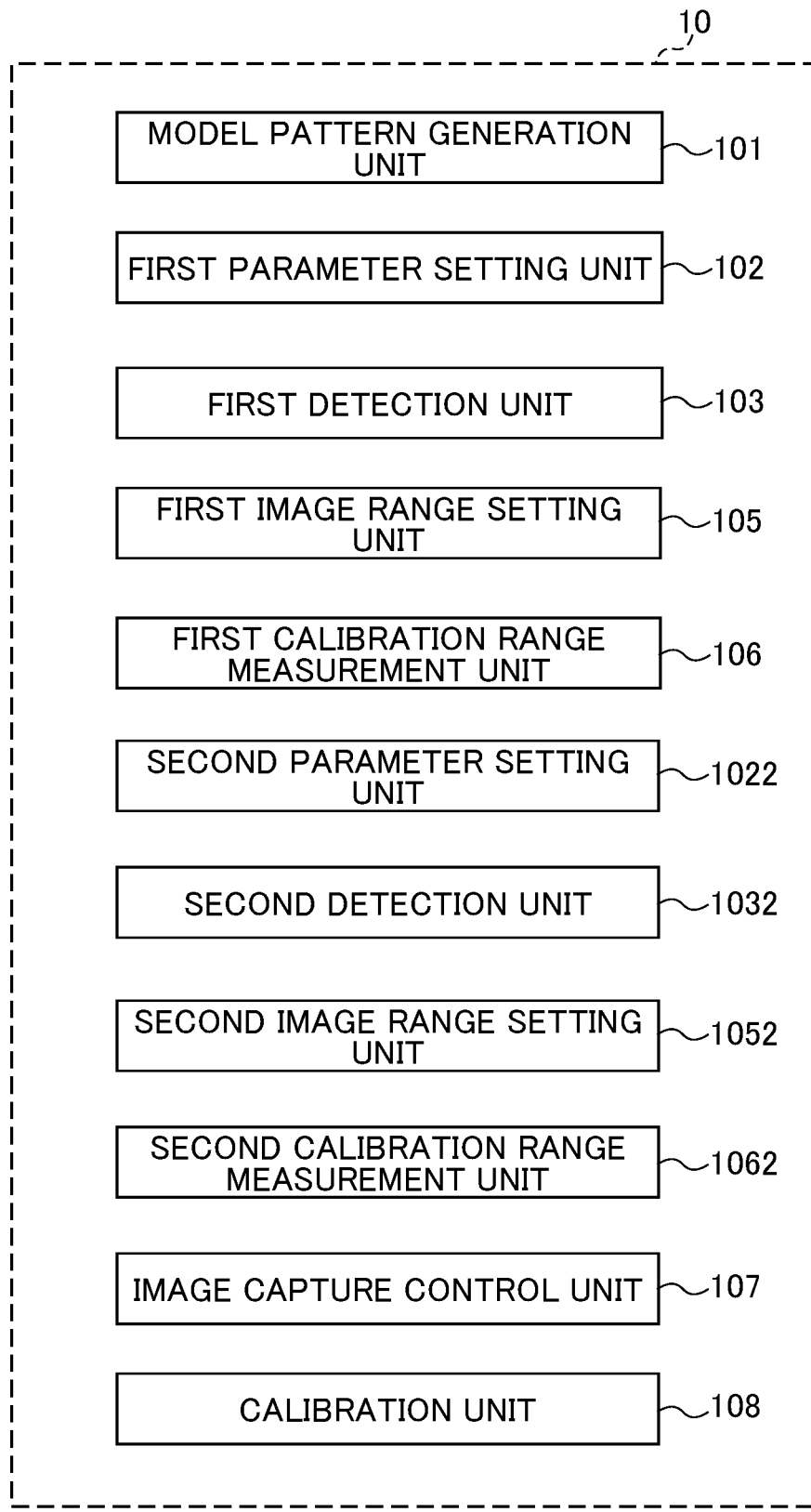
FIG. 14 is a block diagram showing the functional configuration of a CPU 10 in a visual sensor controller 1A.

FIG. 14 is a block diagram showing the functional configuration of a CPU 10 in the visual sensor controller 1A. As shown in FIG. 14, the CPU 10 in the visual sensor controller 1A includes a model pattern generation unit 101, a first parameter setting unit 102, a first detection unit 103, a first image range setting unit 105, a first calibration range measurement unit 106, a second parameter setting unit 1022, a second detection unit 1032, a second image range setting unit 1052, a second calibration range measurement unit 1062, an image capture control unit 107, and a calibration unit 108.

The model pattern generation unit 101 generates a model pattern by making the first camera 21 capture an image of the target mark 5 arranged in the view of the first camera 21. The model pattern generated by using the image captured by the first camera 21 is also used as a model pattern for the second camera 22. A model pattern for the second camera 22 may be generated individually by making the second camera 22 capture an image of the target mark 5 arranged in the view of the second camera 22.

The first parameter setting unit 102 sets a first parameter for detecting a model pattern about the target mark 5 from data about an image captured by the first camera 21. The function of the first parameter setting unit 102 is comparable to that of the first parameter setting unit 102 in the first embodiment.

[Second Parameter Setting Unit 1022]

The following description is for the second parameter setting unit 1022 that uses the model pattern about the target mark 5 generated by using the first camera 21 to set a second parameter for detecting this model pattern from data about an image captured by the second camera 22. The second parameter setting unit 1022 sets the second parameter for detecting the model pattern about the target mark 5 from the data about the image captured by the second camera 22 based on the first parameter. More specifically, the second parameter setting unit 1022 uses the first parameter as it is for initially setting a value of the second parameter. Meanwhile, if a value of the second parameter is set to have a predetermined range during initial setting of the second parameter, for example, the second parameter setting unit 1022 may employ the same range as the first parameter. Alternatively, the second parameter setting unit 1022 may set a wide range for the second parameter covering a predetermined range for the first parameter set by the first parameter setting unit 102. In such cases, if the second detection unit 1032 described later has detected the model pattern about the target mark 5 successfully from the data about the image captured by the second camera 22 by applying a given value of the second parameter, the second parameter setting unit 1022 can set a range for a value of the second parameter again with respect to this value of the second parameter as a center based on a deviation from a center value in the predetermined range for the first parameter. For example, if the first parameter has a size range from 0.9 to 1.1, a center value is 1.0 and a deviation from the center value in the predetermined range for the first parameter is 0.1. If a subject (target mark 5) of the second camera 22 has been detected successfully by setting a size of the second parameter for the second camera 22 at 0.95, a center value of the second parameter is set at 0.95 and the deviation in the first parameter is applied to the second parameter. Specifically, a value of the second parameter is set in a range [0.85 to 1.05] with respect to 0.95 as a center value. In this way, the range for a value of the second parameter during initial setting of the second parameter can be readjusted, so that the model pattern can be detected more efficiently from the data about the image captured by the second camera 22. The second parameter is not limited to these examples.

[First Detection Unit 103]

The first detection unit 103 detects the model pattern about the target mark 5 from the data about the image captured by the first camera 21, and measures the coordinate position of the detected target mark 5 in an image coordinate system at the first camera 21. The function of the first detection unit 103 is comparable to that of the first detection unit 103 in the first embodiment.

[Second Detection Unit 1032]

The second detection unit 1032 detects the model pattern about the target mark 5 from the data about the image captured by the second camera 22, and measures the coordinate position of the detected target mark 5 in an image coordinate system at the second camera 22. Detection process by the second detection unit 1032 can be understood by replacing the camera 2, the first parameter setting unit 102, and the parameter in the description given above in the first embodiment relating to the first detection unit 103 by the second camera 22, the second parameter setting unit 1022, and the second parameter respectively.

[First Image Range Setting Unit 105]

In response to an instruction from an operator, the first image range setting unit 105 sets a first image range in the image captured by the first camera 21 based on the image coordinate system at the first camera 21. The first image range may cover the captured image entirely. The first image range setting unit 105 can designate the first image range as a rectangular range, for example. If a plane on which the target mark 5 attached to an end portion of an arm 41 is to move includes an obstacle, for example, the first image range setting unit 105 may limit the first image range in response to an instruction from the operator so as to avoid the obstacle existing in the view of the first camera 21. In this case, the first image range setting unit 105 may designate the first image range as a closed graphic drawn with multiple line segments. The function of the first image range setting unit 105 is comparable to that of the first image range setting unit 105 in the first embodiment.

[Second Image Range Setting Unit 1052]

Like the first image range setting unit 105, the second image range setting unit 1052 sets a second image range in the image captured by the second camera 22 based on the image coordinate system at the second camera 22. Process by the second image range setting unit 1052 can be understood by replacing the camera 2 in the description given above in the first embodiment relating to the first image range setting unit 105 by the second camera 22.

[First Calibration Range Measurement Unit 106]

The first calibration range measurement unit 106 measures a first calibration range as an operation range for the robot 4 corresponding to the first image range set by the first image range setting unit 105 before implementation of calibration by controlling the robot 4 so as to move the target mark 5 and making the first detection unit 103 detect the target mark 5. More specifically, the first calibration range measurement unit 106 determines whether or not the target mark 5 is detectable in the first image range by the first camera 21 by moving the target mark 5 and detecting the target mark 5 repeatedly, thereby measuring the first calibration range as an operation range for the robot 4 corresponding to the first image range. The function of the first calibration range measurement unit 106 is comparable to that of the first calibration range measurement unit 106 in the first embodiment.

[Second Calibration Range Measurement Unit 1062]

Likewise, the second calibration range measurement unit 1062 determines whether or not the target mark 5 is detectable in the second image range by the second camera 22 by moving the target mark 5 and detecting the target mark 5 repeatedly, thereby measuring a second calibration range as an operation range for the robot 4 corresponding to the second image range. Process by the second calibration range measurement unit 1062 can be understood by replacing the camera 2, the first parameter setting unit 102, the parameter, and the image range in the description given above in the first embodiment relating to the first calibration range measurement unit 106 by the second camera 22, the second parameter setting unit 1022, the second parameter, and the second image range respectively. Like in the first embodiment, the target mark 5 is moved on a plane designated in advance in this embodiment. The first calibration range and the second calibration range are set on the same plane. A flowchart about process of measuring the first calibration range followed by the first calibration range measurement unit 106, and a flowchart about process of measuring the second calibration range followed by the second calibration range measurement unit 1062, can be understood by the replacing the camera 2, the first parameter setting unit 102, the parameter, and the image range referred to in the description in the first embodiment for the flowchart relating to the calibration range measurement unit 106 (FIGS. 8A and 8B) by the first camera 21, the first parameter setting unit 102, the first parameter, and the first image range respectively, and by the second camera 22, the second parameter setting unit 1022, the second parameter, and the second image range respectively. While the first camera 21 and the second camera 22 are calibrated, the visual sensor controller 1A functioning as the calibration device controls the robot 4 so as to move the target mark 5 in at least one of the first calibration range and the second calibration range, or in a range covered by both the first calibration range and the second calibration range. Specifically, the target mark 5 may be moved only in a range covered by both the first calibration range and the second calibration range, only in a range covered by either the first calibration range or the second calibration range, or in a range including the first calibration range and the second calibration range.

[Image Capture Control Unit 107]

The image capture control unit 107 makes the first camera 21 and the second camera 22 capture images of the target mark 5 at each of multiple destination positions attached to the end of the arm 41 of the robot 4 and to be moved by the robot 4 in at least one of the first calibration range and the second calibration range, or in a range covered by both the first calibration range and the second calibration range during implementation of calibration. The number of the destinations is desirably set to be larger than a number minimum for allowing calibration (a desired number is 20 or more, for example) on each of the first camera 21 and the second camera 22. By doing so, calibration can be performed more precisely.

[Calibration Unit 108]

The calibration unit 108 stores the following coordinate positions into the detection result storage 152 at each of multiple destinations of the target mark 5 moved in at least one of the first calibration range and the second calibration range, or in a range covered by both the first calibration range and the second calibration range during implementation of calibration: the coordinate position of the target mark 5 in the image coordinate system at the first camera 21; the coordinate position of the target mark 5 in the image coordinate system at the second camera 22; and the coordinate position of the target mark 5 in the robot coordinate system while the images of the target mark 5 are captured by the first camera 21 and the second camera 22. Then, the calibration unit 108 calibrates the first camera 21 and the second camera 22 based on the coordinate position of the target mark 5 in the image coordinate system at the first camera 21 stored in the detection result storage 152, the coordinate position of the target mark 5 in the image coordinate system at the second camera 22 stored in the detection result storage 152, and the coordinate position of the target mark 5 in the robot coordinate system while the images of the target mark 5 are captured by the first camera 21 and the second camera 22 stored in the detection result storage 152. The first camera 21 and the second camera 22 may be calibrated individually.

Figure 15:
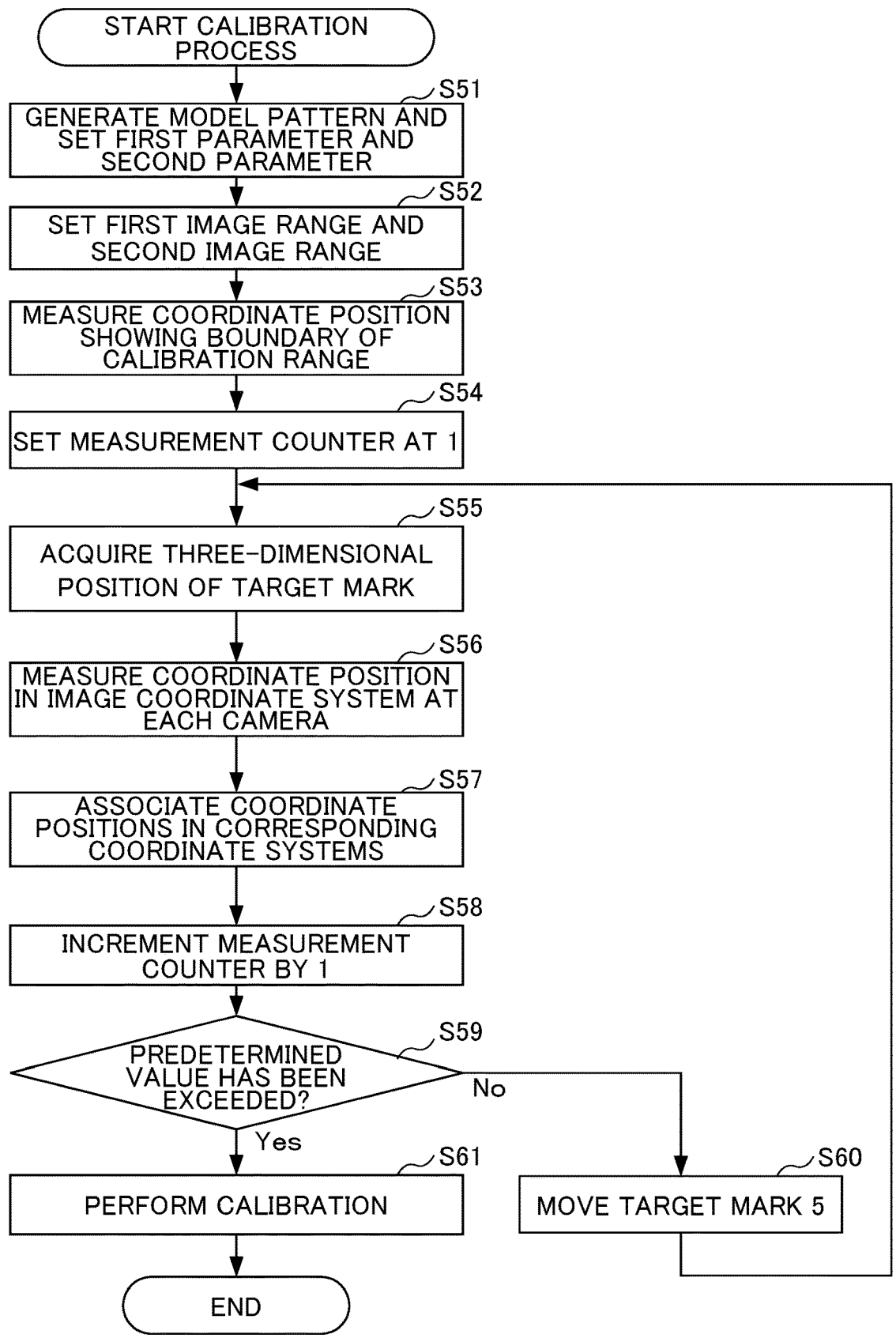
FIG. 15 shows a flowchart showing calibration process on the stereo camera 2A according to the second embodiment.

FIG. 15 is an example of a flowchart showing calibration process on the first camera 21 and the second camera 22 performed by the visual sensor controller 1A (CPU 10) according to this embodiment. This flowchart shows process performed if the target mark 5 is to be moved in a range including the first calibration range and the second calibration range.

In step S51, a model pattern is generated. Further, the first parameter and the second parameter are set.

In step S52, in response to designation by an operator, the CPU 10 (first image range setting unit 105 and second image range setting unit 1052) sets the first image range in an image captured by the first camera 21 in the image coordinate system at the first camera 21, and sets the second image range in an image captured by the second camera 22 in the image coordinate system at the second camera 22.

In step S53, the CPU 10 (first calibration range measurement unit 106 and second calibration range measurement unit 1062) measures a coordinate position in the robot coordinate system showing a boundary of the first calibration range corresponding to the first image range for the first camera 21, and measures a coordinate position in the robot coordinate system showing a boundary of the second calibration range corresponding to the second image range for the second camera 22. In this way, the first calibration range and the second calibration range are set to allow calibration process on the first camera 21 and the second camera 22 to be started.

[Calibration Process]

In step S54, the CPU 10 (calibration unit 108) sets a measurement counter for counting the number of times measurement is made at 1.

In step S55, the CPU 10 (calibration unit 108) acquires the three-dimensional coordinate position of the target mark 5 in the robot coordinate system measured by the robot controller 3.

In step S56, the CPU 10 (first detection unit 103 and second detection unit 1032) detects the target mark 5 from data about the image captured by the first camera 21 and from data about the image captured by the second camera 22, and measures the coordinate position of the detected target mark 5 in each of the image coordinate system at the first camera 21 and the image coordinate system at the second camera 22. The target mark 5 may be detected only from the first camera 21 and the second camera 22. In this case, only a coordinate position in an image coordinate system at a camera having detected the target mark 5 successfully is stored.

In step S57, the CPU 10 (calibration unit 108) stores the three-dimensional coordinate position of the target mark 5 in the robot coordinate system, the coordinate position of the target mark 5 in the image coordinate system at the first camera 21, and the coordinate position of the target mark 5 in the image coordinate system at the second camera 22 in association with each other while the target mark 5 is at a current position.

In step S58, the CPU 10 (calibration unit 108) increments the measurement counter for counting the number of times measurement is made by 1.

In step S59, if the measurement counter does not exceed a predetermined value (No), the flow goes to step S60. If the measurement counter exceeds the predetermined value (Yes), the flow goes to step S61.

In step S60, the robot controller 3 moves the target mark 5 attached to the end of the arm 41 of the robot 4 to a place set in advance in the first calibration range or the second calibration range where the target mark 5 can be measured from at least one of the first camera 21 and the second camera 22. Then, the flow goes to step S55.

In step S61, the CPU 10 (calibration unit 108) calibrates the first camera 21 and the second camera 22 based on the association stored in step S57 between the three-dimensional coordinate position of the target mark 5 in the robot coordinate system, the coordinate position of the target mark 5 in the image coordinate system at the first camera 21, and the coordinate position of the target mark 5 in the image coordinate system at the second camera 22. This process flow is not restrictive but has been described as an example. For example, if the target mark 5 is to be moved only in a range covered by both the first calibration range and the second calibration range, steps S56 and S60 can be replaced as follows. In step S56, only if the target mark 5 is detected from both the first camera 21 and the second camera 22, the coordinate position of the target mark 5 in the image coordinate system at the first camera 21 and the coordinate position of the target mark 5 in the image coordinate system at the second camera 22 may be stored. In step S60, the robot controller 3 moves the target mark 5 attached to the end of the arm 41 of the robot 4 to a place set in advance in the first calibration range and the second calibration range where the target mark 5 can be measured from both the first camera 21 and the second camera 22.

The visual sensor controller 1A of the second embodiment includes: the first image range setting unit 105 that sets the first image range in the image coordinate system at the first camera 21; the first calibration range measurement unit 106 that measures the first calibration range as an operation range for the robot 4 corresponding to the first image range before implementation of calibration by controlling the robot 4 to move the target mark 5 and detecting the target mark 5; the second image range setting unit 1052 that sets the second image range in the image coordinate system at the second camera 22; and the second calibration range measurement unit 1062 that measures the second calibration range as an operation range for the robot 4 corresponding to the second image range before implementation of the calibration by controlling the robot 4 to move the target mark 5 and detecting the target mark 5. In this way, an operation range for the robot 4 (first calibration range and second calibration range) corresponding to a range of move of the target mark 5 is measured in advance before implementation of the calibration based on view ranges for multiple cameras (visual sensors), so that the calibration can be performed with an increased degree of freedom. Further, the target mark 5 is allowed to move in a maximum range for each camera, so that the calibration can be performed more precisely. If space in which the target mark 5 is to move includes an obstacle, for example, the first image range and the second image range are designated in response to an instruction from an operator so as to avoid the obstacle. By doing so, the operation range for the robot 4 (first calibration and second calibration range) can be set efficiently.

Each of the first calibration range and the second calibration range can be configured to be set on a plane. A calibration method of the second embodiment and a program of the second embodiment achieve effects comparable to those achieved by the visual sensor controller 1A of the second embodiment.

The present invention is not limited to the above-described second embodiment. The effects described in the second embodiment are merely a list of most preferred effects resulting from the present invention. Effects achieved by the present invention are not limited to those described in the second embodiment.

[First Modification]

In the second embodiment, the stereo camera 2A includes two cameras. Alternatively, the stereo camera 2A may be configured to include three or more cameras.

[Second Modification]

In the second embodiment, the model pattern generation unit 101 is configured to generate a model pattern by using the first camera 21 and store the generated model pattern. Alternatively, the model pattern generation unit 101 may be configured to generate a model pattern by using the second camera 22 and store the generated model pattern. In the second embodiment, the model pattern generation unit 101 is configured to generate and store a model pattern. Instead of being configured to generate a model pattern by using the first camera 21 or the second camera 22, the model pattern generation unit 101 may be configured to use an existing shape (a shape such as a circle, for example) as the target mark 5.

[Third Modification]

In the second embodiment, the target mark 5 is moved on a plane designated in advance. Further, the first calibration range and the second calibration range are measured on this plane. Alternatively, the first calibration range and the second calibration range may be defined in any three-dimensional space. For example, the plane to be designated in advance may include multiple parallel planes or may be formed by coupling multiple partial planes.

In these embodiments, the visual sensor controller 1 or 1A functions as the calibration device. However, the calibration device is not limited to the visual sensor controller 1 or 1A. The calibration device may be a controller including the visual sensor controller 1 or 1A and the robot controller 3 integrated with each other. Alternatively, the calibration device may cover information processing devices (computers) in general. For example, the calibration device may be a server, a PC, various types of controllers, etc.

The calibration method implemented by the visual sensor controller 1 or 1A is realized by software. To realize the calibration method by software, programs constituting the software are installed on a computer (visual sensor controller 1). These programs may be stored in a removable medium and then distributed to a user. Alternatively, these programs may be distributed by being downloaded onto a computer of the user through a network.

EXPLANATION OF REFERENCE NUMERALS

1000 Robot system
1 Visual sensor controller (calibration device)
1A Visual sensor controller (calibration device)
10 CPU
101 Model pattern generation unit
102 First parameter setting unit 1022 Second parameter setting unit
103 First detection unit
1032 Second detection unit
105 First image range setting unit
1052 Second image range setting unit
106 First calibration range measurement unit
1062 Second calibration range measurement unit
107 Image capture control unit
108 Calibration unit
11 Bus
12 Frame memory
13 ROM
14 RAM
15 Nonvolatile memory
151 Reference information storage
152 Detection result storage
16 Camera interface
17 Monitor interface
18 External equipment interface
19 Monitor
2 Camera
2A Stereo camera
21 First camera
22 Second camera
3 Robot controller
4 Robot
41 Arm
5 Target mark

What is claimed is:

1. A calibration device that associates a robot coordinate system at a robot and an image coordinate system at a camera by placing a target mark at the robot, controlling the robot so as to move the target mark, and detecting the target mark at multiple points in a view of the camera, the calibration device comprising:
a memory configured to store a program; and
a processor configured to execute the program and control the calibration device to:
set an image range in the image coordinate system; and
measure a calibration range as an operation range for the robot corresponding to the image range before implementation of calibration by controlling the robot to move the target mark and detecting the target mark by determining whether or not the target mark is detectable in the image range that was set in the image coordinate system by moving the target mark and detecting the target mark repeatedly, thereby measuring a calibration range as an operation range for the robot corresponding to the set image range, wherein
during implementation of the calibration, the robot is controlled so as to move the target mark in the calibration range.

2. The calibration device according to claim 1, wherein the calibration range is set on a plane.

3. The calibration device according to claim 1, wherein the calibration range is set on a plane that is not tilted from an optical axis of the camera.

4. The calibration device according to claim 1, wherein the calibration range is set on a plane tilted from an optical axis of the camera.

5. The calibration device according to claim 1, wherein the calibration range is set on each of at least two planes.

6. The calibration device according to claim 1, wherein the image range in the image coordinate system is set so as to avoid a target mark obstacle being in the view of the camera; and the calibration range is measured as the operation range for the robot corresponding to the set image range so that a target mark obstacle is avoided in the measured calibration range.

7. A calibration method executed by a calibration device including a memory storing a program and a processor, the calibration device associating a robot coordinate system at a robot and an image coordinate system at a camera by placing a target mark at the robot, controlling the robot so as to move the target mark, and detecting the target mark at multiple points in a view of the camera, the processor executing the program to perform operations of the calibration method comprising:
setting an image range in the image coordinate system; and
measuring a calibration range as an operation range for the robot corresponding to the image range before implementation of calibration by controlling the robot to move the target mark and detecting the target mark by determining whether or not the target mark is detectable in the image range that was set in the image coordinate system by moving the target mark and detecting the target mark repeatedly, thereby measuring a calibration range as an operation range for the robot corresponding to the set image range, wherein
during implementation of the calibration, the robot is controlled so as to move the target mark in the calibration range.

8. The calibration method according to claim 7, wherein the image range in the image coordinate system is set so as to avoid a target mark obstacle being in the view of the camera; and the calibration range is measured as the operation range for the robot corresponding to the set image range so that a target mark obstacle is avoided in the measured calibration range.

9. A non-transitory computer-readable medium encoded with a program for enabling a processor to execute the following steps, the processor controlling a calibration device that associates a robot coordinate system at a robot and an image coordinate system at a camera by placing a target mark at the robot, controlling the robot so as to move the target mark, and detecting the target mark at multiple points in a view of the camera, the program being executed by the processor to perform operations comprising:
setting an image range in the image coordinate system; and
measuring a calibration range as an operation range for the robot corresponding to the image range before implementation of calibration by controlling the robot to move the target mark and detecting the target mark by determining whether or not the target mark is detectable in the image range that was set in the image coordinate system by moving the target mark and detecting the target mark repeatedly, thereby measuring a calibration range as an operation range for the robot corresponding to the set image range, wherein
during implementation of the calibration, the robot is controlled so as to move the target mark in the calibration range.

10. The non-transitory computer-readable medium encoded with a program for enabling a processor to execute steps according to claim 9, wherein the program is further executed by the processor so that the image range in the image coordinate system is set so as to avoid a target mark obstacle being in the view of the camera; and the calibration range is measured as the operation range for the robot corresponding to the set image range so that a target mark obstacle is avoided in the measured calibration range.

11. A calibration device that associates a robot coordinate system at a robot, position information in an image coordinate system at a first camera of a stereo camera, and position information in an image coordinate system at a second camera of the stereo camera by placing a target mark at the robot, controlling the robot so as to move the target mark, and detecting the target mark at multiple points in a view of the stereo camera including at least the first camera and the second camera, the calibration device comprising:
  a memory configured to store a program; and
  a processor configured to execute the program and control the calibration device to:
    set a first image range in the image coordinate system at the first camera;
    set a second image range in the image coordinate system at the second camera;
    measure a first calibration range as a first operation range for the robot corresponding to the first image range before the first camera and the second camera are calibrated by controlling the robot to move the target mark and detecting the target mark by using the first camera by determining whether or not the target mark is detectable in the first image range that was set in the image coordinate system by moving the target mark and detecting the target mark repeatedly, thereby measuring a first calibration range as a first operation range for the robot corresponding to the set first image range; and
    measure a second calibration range as a second operation range for the robot corresponding to the second image range before the first camera and the second camera are calibrated by controlling the robot to move the target mark and detecting the target mark by using the second camera by determining whether or not the target mark is detectable in the second image range that was set in the image coordinate system by moving the target mark and detecting the target mark repeatedly, thereby measuring a second calibration range as a second operation range for the robot corresponding to the set second image range, wherein
    while the first camera and the second camera are calibrated, the robot is controlled so as to move the target mark in at least one of the first calibration range and the second calibration range, or in a range covered by both the first calibration range and the second calibration range.

12. The calibration device according to claim 11, wherein each of the first calibration range and the second calibration range is set on a plane.

13. The calibration device according to claim 11, wherein
  the first image range in the image coordinate system is set so as to avoid a target mark obstacle being in the view of the stereo camera and the second image range in the image coordinate system is set so as to avoid a target mark obstacle being in the view of the stereo camera; and
  the first calibration range is measured as the first operation range for the robot corresponding to the set first image range so that a target mark obstacle is avoided in the measured first calibration range and the second calibration range is measured as the second operation range for the robot corresponding to the set second image range so that a target mark obstacle is avoided in the measured second calibration range.

14. A calibration method executed by a calibration device including a memory storing a program and a processor, the calibration device associating a robot coordinate system at a robot, position information in an image coordinate system at a first camera of a stereo camera, and position information in an image coordinate system at a second camera of the stereo camera by placing a target mark at the robot, controlling the robot so as to move the target mark, and detecting the target mark at multiple points in a view of the stereo camera including at least the first camera and the second camera, the processor executing the program to perform operations of the calibration method comprising:
  setting a first image range in the image coordinate system at the first camera;
  setting a second image range in the image coordinate system at the second camera;
  measuring a first calibration range as a first operation range for the robot corresponding to the first image range before the first camera and the second camera are calibrated by controlling the robot to move the target mark and detecting the target mark by using the first camera by determining whether or not the target mark is detectable in the first image range that was set in the image coordinate system by moving the target mark and detecting the target mark repeatedly, thereby measuring a first calibration range as a first operation range for the robot corresponding to the set first image range; and
  measuring a second calibration range as a second operation range for the robot corresponding to the second image range before the first camera and the second camera are calibrated by controlling the robot to move the target mark and detecting the target mark by using the second camera by determining whether or not the target mark is detectable in the second image range that was set in the image coordinate system by moving the target mark and detecting the target mark repeatedly, thereby measuring a second calibration range as a second operation range for the robot corresponding to the set second image range, wherein
  while the first camera and the second camera are calibrated, the robot is controlled so as to move the target mark in at least one of the first calibration range and the second calibration range, or in a range covered by both the first calibration range and the second calibration range.

15. The calibration method according to claim 14, wherein
  the first image range in the image coordinate system is set so as to avoid a target mark obstacle being in the view of the stereo camera and the second image range in the image coordinate system is set so as to avoid a target mark obstacle being in the view of the stereo camera; and
  the first calibration range is measured as the first operation range for the robot corresponding to the set first image range so that a target mark obstacle is avoided in the measured first calibration range and the second calibration range is measured as the second operation range for the robot corresponding to the set second image range so that a target mark obstacle is avoided in the measured second calibration range.

16. A non-transitory computer-readable medium encoded with a program for enabling a processor to execute the following steps, the processor controlling a calibration device that associates a robot coordinate system at a robot, position information in an image coordinate system at a first camera of a stereo camera, and position information in an image coordinate system at a second camera of the stereo camera by placing a target mark at the robot, controlling the robot so as to move the target mark, and detecting the target mark at multiple points in a view of the stereo camera including at least the first camera and the second camera, the program being executed by the processor to perform operations comprising:

setting a first image range in the image coordinate system at the first camera;

setting a second image range in the image coordinate system at the second camera;

measuring a first calibration range as a first operation range for the robot corresponding to the first image range before the first camera and the second camera are calibrated by controlling the robot to move the target mark and detecting the target mark by using the first camera by determining whether or not the target mark is detectable in the first image range that was set in the image coordinate system by moving the target mark and detecting the target mark repeatedly, thereby measuring a first calibration range as a first operation range for the robot corresponding to the set first image range; and measuring a second calibration range as a second operation range for the robot corresponding to the second image range before the first camera and the second camera are calibrated by controlling the robot to move the target mark and detecting the target mark by using the second camera by determining whether or not the target mark is detectable in the second image range that was set in the image coordinate system by moving the target mark and detecting the target mark repeatedly, thereby measuring a second calibration range as a second operation range for the robot corresponding to the set second image range, wherein while the first camera and the second camera are calibrated, the robot is controlled so as to move the target mark in at least one of the first calibration range and the second calibration range, or in a range covered by both the first calibration range and the second calibration range.

17. The non-transitory computer-readable medium encoded with a program for enabling a processor to execute steps according to claim 16, wherein the program is further executed by the processor so that the first image range in the image coordinate system is set so as to avoid a target mark obstacle being in the view of the stereo camera and the second image range in the image coordinate system is set so as to avoid a target mark obstacle being in the view of the stereo camera; and the first calibration range is measured as the first operation range for the robot corresponding to the set first image range so that a target mark obstacle is avoided in the measured first calibration range and the second calibration range is measured as the second operation range for the robot corresponding to the set second image range so that a target mark obstacle is avoided in the measured second calibration range.

* * * * *